United States Patent
Ma et al.

(10) Patent No.: US 12,201,055 B2
(45) Date of Patent: Jan. 21, 2025

(54) AUTONOMOUS WORKING SYSTEM

(71) Applicant: SHANGHAI SUNSEEKER ROBOTIC TECHNOLOGY CO., LTD., Shanghai (CN)

(72) Inventors: Miaowu Ma, Shanghai (CN); Jian Xiong, Shanghai (CN); Fangshi Liu, Shanghai (CN)

(73) Assignee: SHANGHAI SUNSEEKER ROBOTIC TECHNOLOGY CO., LTD., Shanghai (CN)

( * ) Notice: Subject to any disclaimer, the term of this patent is extended or adjusted under 35 U.S.C. 154(b) by 82 days.

(21) Appl. No.: 17/598,971

(22) PCT Filed: Mar. 3, 2021

(86) PCT No.: PCT/CN2021/078801
§ 371 (c)(1),
(2) Date: Sep. 28, 2021

(87) PCT Pub. No.: WO2021/175235
PCT Pub. Date: Sep. 10, 2021

(65) Prior Publication Data
US 2023/0017821 A1    Jan. 19, 2023

(30) Foreign Application Priority Data

Mar. 3, 2020 (CN) .......................... 202010138898.4
Apr. 30, 2020 (CN) .......................... 202010362886.X
(Continued)

(51) Int. Cl.
*A01D 34/00* (2006.01)
*A01D 101/00* (2006.01)

(52) U.S. Cl.
CPC ........ *A01D 34/008* (2013.01); *A01D 2101/00* (2013.01)

(58) Field of Classification Search
CPC .......................... A01D 34/008; B60W 2555/20
See application file for complete search history.

(56) References Cited

U.S. PATENT DOCUMENTS

2013/0317318 A1* 11/2013 Tartz .................... A61B 5/7221
600/301
2018/0368312 A1* 12/2018 Strang .................. A47L 9/2805

FOREIGN PATENT DOCUMENTS

CN         2427514 Y       4/2001
CN       203112939 U       8/2013
(Continued)

OTHER PUBLICATIONS

Translation of CN-208016343-U.*
(Continued)

*Primary Examiner* — Russell Frejd
*Assistant Examiner* — Sara J Lewandroski
(74) *Attorney, Agent, or Firm* — Karceski IP Law, PLLC

(57) ABSTRACT

An autonomous working system includes an autonomous working apparatus and a second apparatus independent of the autonomous working apparatus. The autonomous working system includes a control circuit, wherein the control circuit includes a rain sensor, including a first electrode and a second electrode; a switching circuit, connected to the first electrode and the second electrode, and configured to operatively exchange the polarities of the first electrode and the second electrode; a detection module, configured to obtain an electrical signal of the rain sensor; a judgement module, configured to determine whether the electrical signal and a first threshold satisfy a first relationship; and a behavior control module, configured to control the autonomous working apparatus to change the behavior status when it is determined that the electrical signal and the first threshold satisfy the first relationship.

18 Claims, 4 Drawing Sheets

(30) Foreign Application Priority Data

| | | | |
|---|---|---|---|
| Apr. 30, 2020 | (CN) | ......................... | 202020717856.1 |
| Apr. 30, 2020 | (CN) | ......................... | 202020717898.5 |
| Jun. 1, 2020 | (CN) | ......................... | 202010484333.1 |
| Jun. 1, 2020 | (CN) | ......................... | 202010485029.9 |
| Jun. 1, 2020 | (CN) | ......................... | 202020968380.9 |
| Jun. 1, 2020 | (CN) | ......................... | 202020968391.7 |
| Aug. 5, 2020 | (CN) | ......................... | 202010780249.4 |
| Aug. 5, 2020 | (CN) | ......................... | 202021611289.8 |

(56) References Cited

FOREIGN PATENT DOCUMENTS

| | | | | |
|---|---|---|---|---|
| CN | 204557547 U | * | 8/2015 | |
| CN | 208016343 U | * | 10/2018 | .............. G01W 1/14 |
| CN | 212539202 U | | 2/2021 | |
| DE | 102007049198 A1 | | 4/2009 | |

OTHER PUBLICATIONS

Translation of CN-204557547-U.*
International Search Report dated May 27, 2021, for International Patent Application No. PCT/CN2021/078801.

* cited by examiner

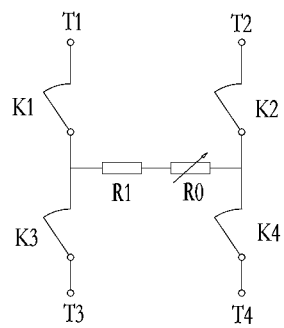
FIGURE 7
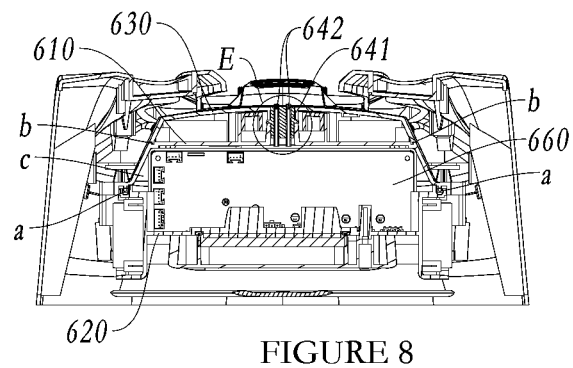
FIGURE 8
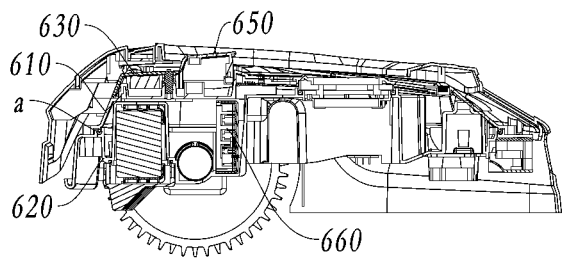
FIGURE 9
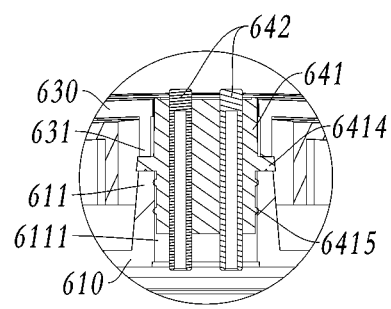
FIGURE 10
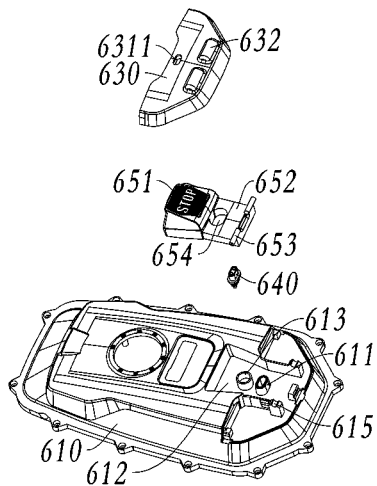
FIGURE 11
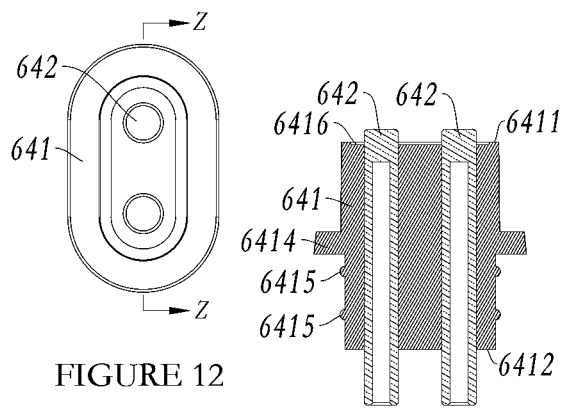
FIGURE 12
FIGURE 13

AUTONOMOUS WORKING SYSTEM

CROSS-REFERENCE TO RELATED APPLICATION(S)

This is a National Stage Entry into the United States Patent and Trademark Office from International Patent Application No. PCT/CN2021/078801, filed on Mar. 3, 2021, which claims priority to the following applications: CN 202010138898.4, filed on Mar. 3, 2020; CN 202020717898.5, filed on Apr. 30, 2020; CN 202010362886. X, filed on Apr. 30, 2020; CN 202020717856.1, filed on Apr. 30, 2020; CN 202020968391.7, filed on Jun. 1, 2020; CN 202010485029.9, filed on Jun. 1, 2020; CN 202020968380.9, filed on Jun. 1, 2020; CN 202021611289.8, filed on Aug. 5, 2020; CN 202010484333.1, filed on Jun. 1, 2020; and CN 202010780249.4, filed on Aug. 5, 2020, the entire contents of all of which are incorporated herein by reference.

FIELD OF THE INVENTION

Example embodiments generally relate to the field of automatic technology, further particularly relate to an autonomous working system.

DESCRIPTION OF THE RELATED ART

At present, there are various walking robots on the market, such as robots for mowing, robots for sweeping and/or mopping. These walking robots may work in various environments, such as indoor environments and/or outdoor environments. For the robots working in the outdoor environments (hereinafter referred to as autonomous working apparatus), such as robotic mowers, their behavior statuses are greatly affected by the environments. For example, in rainy day, if the robotic mower continues to work on the muddy lawn, on one hand, a large amount of muddy water will adhere to the robotic mower, which is likely to cause a fault of the robotic mower, and on the other hand, the lawn is also vulnerable to damage. Therefore, such autonomous working apparatus is usually equipped with environmental sensors to monitor the working environment. These environmental sensors can include, for example, a rain sensor, which is used for detecting whether the robot is exposed to rain during the working process, and when it is determined that the robot is exposed to rain, causing the robot to automatically stop working or issuing an alarm. However, in some existing solutions, the rain sensor has the problem of inaccurate signal measurement. In some other existing solutions, the rain sensor is arranged on the robotic mower, when the robotic mower stops at a docking station due to rain, if the docking station is equipped with a shelter or a canopy, the rain sensor will be covered by the shelter or the canopy and cannot continue to receive rainwater, such that the robotic mower cannot accurately judge when the rain stops.

SUMMARY OF THE INVENTION

In order to solve the above technical problems and to improve the accuracy of robot control, embodiments of the present invention provide an autonomous working system.

Some example embodiments may therefore provide an autonomous working system, comprising an autonomous working apparatus and a second apparatus independent of the autonomous working apparatus; the autonomous working system comprises a control circuit; wherein the control circuit comprises: a rain sensor, comprising a first electrode and a second electrode; a switching circuit, connected to the first electrode and the second electrode, and configured to operatively exchange the polarities of the first electrode and the second electrode; a detection module, configured to obtain an electrical signal of the rain sensor; a judgement module, configured to determine whether the electrical signal and a first threshold satisfy a first relationship; and a behavior control module, configured to control the autonomous working apparatus to change the behavior status when it is determined that the electrical signal and the first threshold satisfy the first relationship.

As an embodiment of the present invention, the control circuit is configured on the autonomous working apparatus. As another embodiment of the present invention, the control circuit is configured to comprise a first communication module which is configured to send an electrical signal to the autonomous working apparatus to cause the autonomous working apparatus changing its behavior status in response to the electrical signal; the rain sensor, the detection module and the first communication module are configured on the second apparatus; the judgement module is configured on the autonomous working apparatus or on the second apparatus.

Some example embodiments may therefore provide a rain sensor comprising a base and at least a pair of electrodes; the base has an upper end face and a lower end face, which are opposite to each other; the lower end face is intended to be exposed to the inside of a sealed cavity, and the upper end face is intended to be exposed to the outside of the sealed cavity; and at least one of the electrodes is embedded in the base, and the both ends of the electrode penetrate through the upper end face and the lower end face respectively.

Some example embodiments may therefore provide a rain sensor comprising a base, at least a pair of electrodes and a protrusion body; the base has an upper end face and a lower end face, which are opposite to each other; the upper end of the electrode is at least partially exposed out of the upper end face of the base; and the protrusion body is at least partially configured directly above the upper end face, and there is a gap between at least a part of the protrusion body and the upper end face.

BRIEF DESCRIPTION OF THE DRAWING(S)

FIG. 7 is a schematic diagram of a switching circuit according to some embodiments of the present invention.

FIG. 8 is an X-X section view of FIG. 1.

FIG. 9 is a Y-Y section view of FIG. 1.

FIG. 10 is an enlarged view of part E of FIG. 8.

FIG. 11 is an exploded view (in part) of an autonomous working apparatus of an embodiment of the present invention.

FIG. 12 is a top view of a rain sensor according to an embodiment of the present invention.

FIG. 13 is a Z-Z section view of FIG. 12.

DETAILED DESCRIPTION OF EMBODIMENT(S) OF THE INVENTION

Figure 1:
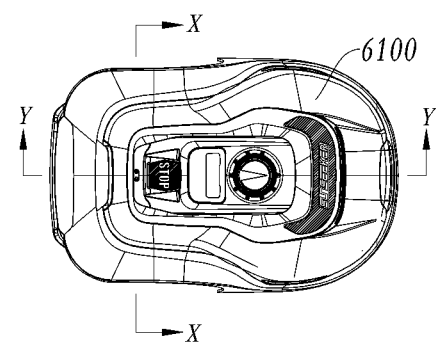
FIG. 1 is a top view of an autonomous working apparatus according to an embodiment of the present invention.

The present invention will be described in detail below in connection with the specific embodiments shown in the accompanying drawings. However, these embodiments do not limit the present invention, and structural, methodological, or functional modifications made by a person of ordinary skill in the art in accordance with these embodiments are included within the scope of protection of the present invention.

In the following, the various embodiments of the invention will be described in detail in connection with the accompanying drawings, so that the objects, features and advantages of the invention can be more clearly understood. It should be understood that the embodiments shown in the accompanying drawings are not intended to limit the scope of the present invention, but only to illustrate the substantial spirit of the technical solutions of the invention.

In the description below, certain specific details are set forth for the purpose of illustrating various embodiments of the disclosure in order to provide a thorough understanding of various embodiments of the disclosure. However, those skilled in the art will recognize that embodiments may be practiced without one or more of these specific details. In other instances, familiar devices, structures and techniques associated with the present application may not be shown or described in detail so as to avoid unnecessary confusion in the description of the embodiments.

Unless the context otherwise requires, the word "includes" and its variants, such as "contains", "comprises" and "has", should be understood throughout the specification and claims as having an open, inclusive meaning, i.e. as "includes, but is not limited to".

References to "an embodiment" or "some embodiments" throughout the specification indicate that a particular feature, structure or characteristic described in conjunction with an embodiment is included in at least one embodiment. Thus, the occurrence of the words "in one embodiment" or "in some embodiments" throughout the specification need not all refer to the same embodiment. In addition, particular features, structures or characteristics may be combined in any way in one or more embodiments.

The singular forms "a" and "an", as used in the specification and accompanying claims, include one referent or more than one referents unless the context clearly provides otherwise. It should be noted that the term "or" is normally used in the sense that it includes "and/or", unless the context clearly specifies otherwise.

The term "equal" and its variants, as used in the specification and the claims, refers to the equality of two physical quantities or parameters in an ideal situation. The person skilled in the art should be aware that in the practical implementation of the technical solution, there are permissible errors and that two physical quantities or parameters are considered equal when the difference between them is not greater than this permissible error. Similarly, the descriptions "not greater than", "not less than" and "not equal to" all refer to "not greater than", "not less than" and "not equal to" within the permissible error range. In addition, "substantially equal" as used in the specification and claims means that two physical quantities or parameters are equal in the same sense of validity for a given determination, for example, depending on the application scenario, the difference between two physical quantities or parameters is not equal. For example, depending on the application, a difference between two physical quantities or parameters within 2%, 5% or 10% may be considered substantially equal, provided that the validity of the judgement between the two physical quantities or parameters is the same.

Refer to FIG. 1-FIG. 18, a typical embodiment of the present invention provides an autonomous working system comprising an autonomous working apparatus 6100, a docking station 6900 and a perimeter.

The autonomous working apparatus 6100 is especially a robot that can autonomously move within a preset area defined by the perimeter and perform specific works, such as a robotic sweeper/vacuum cleaner that performs cleaning works, or a robotic lawn mower that perform mowing works, and so on, wherein the specific operation refers in particular to the treatment of the working surface which results in a change of the condition of the working surface. The present invention is described in detail by taking the robotic lawn mower as an example. The autonomous working apparatus 6100 can autonomously walk on the surface of the working area, especially as the robotic lawn mower, can autonomously perform mowing operations on the lawn. The autonomous working apparatus at least includes a main body mechanism, a moving mechanism, a working mechanism, an energy source module, a detection module, an interactive module, a control module, and so on.

The main body mechanism usually includes a chassis and a housing. The chassis is used for mounting and accommodating functional mechanisms and functional modules such as the moving mechanism, the working mechanism, the energy source module, the detection module, the interactive module and the control module. The housing is usually configured to at least partially cover the chassis, and mainly plays a role of enhancing the aesthetics and identification of the autonomous working apparatus. In this embodiment, the housing is configured to be able to translate and/or rotate resettably relative to the chassis by an external force, and cooperate with an appropriate detection module, such as a Hall sensor, to further serve to sense events such as collision, lift-up, etc.

The moving mechanism is configured to support the main body mechanism on the ground and drive the main body mechanism to move, and usually includes a wheel type mechanism, a track type or half-track type mechanism, or a leg type mechanism, etc. In this embodiment, the moving mechanism is a wheel type mechanism, which includes at least one driving wheel and at least one moving prime motor. The moving prime motor is preferably an electric motor, and in other embodiments, it can also be an internal combustion engine or a machine that uses other types of energy sources to generate power. In this embodiment, the moving mechanism preferably includes a left driving wheel, a left driving prime motor for driving the left driving wheel, a right driving wheel and a right driving prime motor for driving the right driving wheel. In this embodiment, the rectilinear motion of the autonomous working apparatus 6100 is realized by the rotation of the left and right driving wheels at the same speed in the same direction, and the steering motion is realized by the rotation of the left and right driving wheels at different speeds in the same direction or opposite rotations. In other embodiments, the moving mechanism can further include a steering mechanism independent of the driving wheel and a steering prime motor independent of the moving prime motor. In this embodiment, the moving mechanism further includes at least one driven wheel, the driven wheel is typically configured as a caster, and the driving wheel and the driven wheel are respectively located at the front and rear ends of the autonomous working apparatus 6100.

The working mechanism is configured to perform specific operations, and includes a working component and a working prime motor for driving the working component. Exemplarily, for the robotic sweeper/vacuum cleaner, the working component includes a rolling brush, a dust absorption pipe, a dust collection chamber, and the like; for the robotic lawn mower, the working component includes a cutting blade or a cutting head plate, and further includes other components for optimizing or regulating the mowing effect, such as a height adjustment mechanism for adjusting the mowing height. The working prime motor is preferably an electric motor, and in other embodiments, it can also be an internal combustion engine or a machine that uses other types of energy sources to generate power. In some other embodiments, the working prime motor and the walking prime motor are configured as the same prime motor.

The energy source module is configured to provide energy for various works of the autonomous working apparatus 6100. In this embodiment, the energy source module includes a battery pack and a charging connection structure, wherein the battery pack is preferably a rechargeable battery pack and further preferably a lithium ion battery pack, and the charging connection structure is preferably a charging docking unit that can be exposed at the outside of the autonomous working apparatus. In other embodiments, the charging connection structure can be a wireless charging interface.

The detection module is configured as at least one sensor that senses environmental parameters of the autonomous working apparatus 6100 or its own working parameters. Typically, the detection module can include sensors related to the perimeter of the working area, such as magnetic induction, collision, ultrasonic, infrared, radio and other types. The sensor type is adapted to the position and number of corresponding signals generating devices that generate signals to define the limits of the working area. The detection module can further include sensors related to positioning and navigation, such as a GNSS device, a LIDAR device, an electronic compass, an acceleration sensor, an odometer, an angle sensor, and a geomagnetic sensor, etc. The detection module can further include sensors related to its own work safety, such as an obstacle sensor, a lifting sensor, and a battery pack temperature sensor, etc. The detection module can further include sensors related to the external environment, such as an environmental temperature sensor, an environmental humidity sensor, an illumination sensor, and a rain sensor 640, etc. In other embodiments, at least part of the detection module is constructed on the docking station 6900 to exchange data via communication between the autonomous working apparatus 6100 and the docking station 6900.

The interactive module is configured to at least receive control instruction information input by users, send information needed to be perceived by users, communicate with other systems or apparatus to send and receive information, and so on. In this embodiment, the interactive module includes an input device arranged on the autonomous working apparatus 6100 for receiving the control instruction information input by users, typically such as a control panel, and a stop button 650; and the interactive module further includes a display screen, an indicator light and/or a buzzer, which are arranged on the autonomous working apparatus 6100 for enabling the user to perceive information by emitting light or sound. In other embodiments, the interactive module includes a communication module arranged on the autonomous working apparatus 6100 and terminal apparatus independent of the autonomous working apparatus 6100, such as a mobile phone, a computer and a network server, etc., and the control instruction information or other user control information can be input on the terminal apparatus and reach the autonomous working apparatus 6100 via a wired or wireless communication module. In some other embodiments, at least part of the interaction module is constructed on the docking station 6900 to exchange data via communication between the autonomous operating device 6100 and the docking station 6900.

The control module usually includes at least one processor and at least one non-volatile memory, a computer program or instruction set is pre-written in the memory, and the processor controls the execution of the autonomous working apparatus 6100 according to the computer program or the instruction set, such as moving, working and other actions. Further, the control module can also control and adjust corresponding behaviors of the autonomous working apparatus 6100 and modify the parameters in the memory according to the signal of the detection module and/or the user control instruction.

The perimeter is used for defining the working area of the autonomous working system, and usually includes an outer perimeter and an inner perimeter 8002. The autonomous working apparatus 6100 is limited to move and work within the outer perimeter, beyond the inner perimeter, or between the outer perimeter and the inner perimeter. The perimeter can be physical, typically such as walls, fences and railings, etc. The perimeter can also be non-physical, typically such as an electromagnetic signal or an optical signal sent by a signal generator, or a virtual perimeter of an electronic map formed by two-dimensional or three-dimensional coordinates for the autonomous working apparatus 6100 provided with a positioning device (such as GNSS). In this embodiment, the perimeter is configured as a closed energization wire electrically connected with the perimeter signal generating device, and the perimeter signal generating device is usually arranged in the docking station 6900.

The docking station is usually constructed on or within the perimeter for the docking and/or parking of the autonomous working apparatus. In particular, the docking station is provided with a power supply docking unit adapted to the charging docking unit, and when the charging docking unit is docked with the power supply docking unit, the docking station can supply energy to the autonomous working apparatus in the docking station.

The conventional rain sensor includes two electrodes arranged at intervals, and a voltage is applied between the two electrodes. Under normal circumstances, the two electrodes are insulated from each other, an open circuit is formed between the rain sensor and a control circuit inside the autonomous working apparatus, when it rains, rainwater is collected in a groove of a base of the rain sensor, and since the free ion concentration of the rainwater is relatively large, the two electrodes are conducted. Therefore, whether it is raining can be determined by measuring the resistance of the rain sensor, so that the autonomous working apparatus can be controlled accordingly.

However, when the voltage is applied between the two electrodes of the rain sensor, polarization layers are generated on the two electrodes, and a capacitance effect is generated between the two electrodes at the same time. At this time, the rain sensor is no longer a pure resistor, but is an impedor including capacitive reactance. When current flows through the rainwater between the two electrodes, a concentration polarization phenomenon will be generated near the two electrodes, which makes the measurement of the resistance of the rain sensor more inaccurate, such that it is difficult to accurately control the operation of the robot. Furthermore, the two energized electrodes of the rain sensor and the rainwater between the two energized electrodes form an electrolytic tank, the electrodes are usually made of impure metals, so electrochemical corrosion occurs through electrode reactions, resulting in a change in the specific resistance on the surface of the electrode, and the specific resistance is increased in general, which makes the detection of the rainwater become insensitive.

Figure 2:
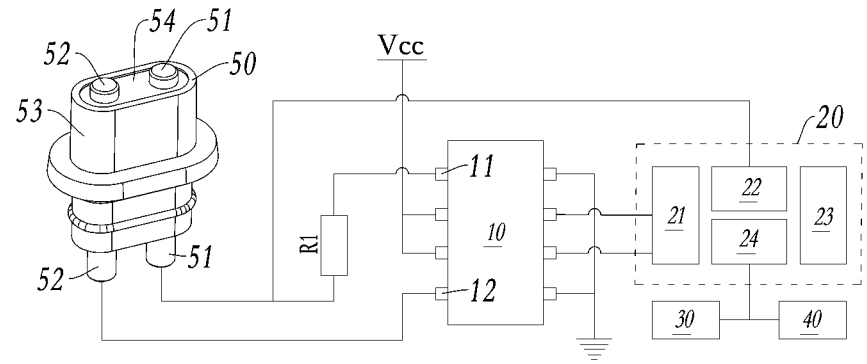
FIG. 2 is a schematic diagram of the structure of a control circuit for an autonomous working apparatus according to some embodiments of the present invention.

FIG. 2 shows a schematic structural diagram of a control circuit 200 for autonomous working apparatus according to some embodiments of the present invention. For example, the control circuit 200 can be located in autonomous working apparatus 6100 shown in FIG. 1. As shown in FIG. 2, the control circuit 200 includes a switching circuit 10 and a main controller 20 connected to the switching circuit 10. The switching circuit 10 includes a first end 11 and a second end 12, wherein the first end 11 and the second end 12 are respectively connected to a first electrode 51 and a second electrode 52 of a rain sensor 50 installed on the autonomous working apparatus 6100. Here, the first electrode 51 and the second electrode 52 can have different polarities by applying a voltage to the first electrode 51 and the second electrode 52. As shown in FIG. 2, the first electrode 51 and the second electrode 52 are arranged on an insulating base 53 of the rain sensor 50 at intervals and penetrate through the base 53. When it rains, the rainwater collected in a groove 54 on the top of the base 53 will conduct the first electrode 51 and the second electrode 52 to form an electrical path. In one embodiment, the switching circuit 10 includes an H-bridge circuit. FIG. 7 exemplarily shows a schematic diagram of the switching circuit 10 according to some embodiments of the present invention, wherein the rain sensor 50 is equivalent to a variable resistor R0, a terminal T1 and a terminal T2 are connected to a power supply, and a terminal T3 and a terminal T4 are grounded. In one connection state, a switch K1 and a switch K4 are turned on, and a switch K2 and a switch K3 are turned off, then the left end of the variable resistor R0 is at a high potential, and the right end of the variable resistor R0 is at a low potential. In another connection state, the switch K1 and the switch K4 are turned off, and the switch K2 and the switch K3 are turned on, then the left end of the variable resistor R0 is at a low potential, and the right end of the variable resistor R0 is at a high potential. The switches K1-K4 can be mechanical switches, electronic switches (such as MOS tubes) and so on. It should be understood that the description of FIG. 7 is schematic, and those skilled in the art can make various specific implementation solutions within the framework of this principle in combination with actual conditions. More specifically, the switching circuit 10 can be an H-bridge integrated chip, such as L9100S.

Figure 3:
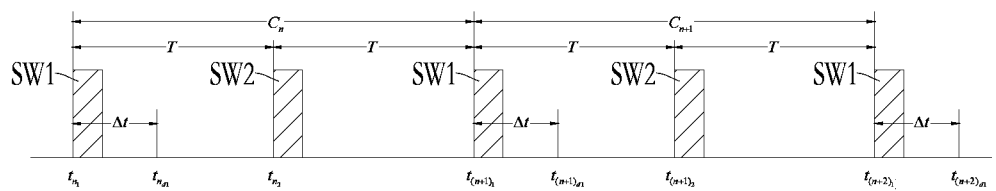
FIG. 3 is a timing diagram of a switching signal according to an embodiment of the present invention.

The main controller 20 can be implemented on a single chip microcomputer or a single chip, and can also be implemented on multiple single chip microcomputers or multiple chips. The main controller 20 can include a switching control module 21, configured to send a switching signal to the switching circuit 10 every predetermined time interval to exchange the polarities of the first electrode 51 and the second electrode 52 of the rain sensor 50. FIG. 3 shows a timing diagram of the switching signal according to an embodiment of the present invention. As shown in FIG. 3, within each cycle C, the switching control module 21 sends a switching signal SW to the switching circuit 10 every predetermined time interval T, and the switching signal SW is used for controlling the switching circuit 10 to exchange the polarities of the first electrode 51 and the second electrode 52 of the rain sensor 50. Taking the $n^{th}$ cycle $C_n$ as an example, the switching control module 21 respectively sends a switching signal SW1 and a switching signal SW2 to the switching circuit 10 at the moment $t_{n_1}$ and the moment $t_{n_2}$ after the predetermined time interval T. In one example, the switching signals SW1 and SW2 can be exactly the same signal, for example, a single pulse signal, which is only used for instructing the switching circuit 10 to switch the polarity. In another example, the switching signals SW1 and SW2 can be different signals, which include additional information in addition to instructing the switching circuit 10 to switch the polarity. In another embodiment, the switching signals SW1 and SW2 can be simple high and low electrical level signals, and can also be communication signals conforming to a certain communication protocol. In other embodiments, the switching control module 21 may not be arranged on the main controller 20, but is separately arranged or integrated in the switching circuit 10, that is, the switching circuit 10 autonomously controls the polarity exchange of the electrodes 51 and 52. Hereinafter, the description will be made by taking it as an example that the switching circuit 10 receives the switching signal from the switching control module 21 to exchange the polarities of the electrodes 51 and 52. However, those skilled in the art can understand that the present invention can also be implemented as that the switching circuit 10 autonomously controls the polarity exchange of the electrodes 51 and 52 without going beyond the scope of the present invention.

Assuming that the switching circuit 10 receives the first switching signal SW1 at the moment $t_{n_1}$, it enters a first output state, and the first end 11 is at a high potential in the first output state (in this embodiment, the first end 11 is connected to the power supply Vcc), and the second end 12 is at a low potential (in this embodiment, the second end 12 is grounded). At this time, the first electrode 51 connected to the first end 11 is at a high potential, and the second electrode 52 connected to the second end 12 is at a low potential, so that in the system of the first electrode 51—rainwater (may exist)—the second electrode 52, the first electrode 51 is a positive electrode, and the second electrode 52 is a negative electrode.

At the moment $t_{n_2}$ after the predetermined time interval T, the switching circuit 10 receives the second switching signal SW2, and enters a second output state. In the second output state, the first end 11 is at a low potential (in this embodiment, the first end 11 is grounded), and the second end 12 is at a high potential (in this embodiment, the second end 12 is connected to the power supply Vcc). At this time, the first electrode 51 connected to the first end 11 is at a low potential, and the second electrode 52 connected to the second end 12 is at a high potential, so that in the system of the first electrode 51—rainwater (may exist)—the second electrode 52, the first electrode 51 is a negative electrode, and the second electrode 52 is a positive electrode. In addition, since the switching control module 21 sends a switching signal to the switching circuit 10 every predetermined time T, the duration of the first output state is substantially equal to the duration of the second output state. In this way, within a cycle C, the positive and negative electrodes of the rain sensor 50 are exchanged twice and respectively last for the same time interval T, so that the rainwater concentration polarization phenomenon in the rain sensor 50 can be avoided or reduced, and the electrochemical corrosion of the electrodes can be effectively reduced and slowed down at the same time.

The main controller 20 further includes a detection module 22, configured to obtain an electrical signal of the rain sensor 50 within the predetermined time interval T. As shown in FIG. 3, it is assumed that within the cycle $C_n$, the detection module 22 detects the electrical signal of the rain sensor 50 at the moment $t_{n_{d1}}$ after the moment $t_{n_1}$. According to the embodiment of the present invention, in order to maintain the consistency of measurement, within each cycle C, the detection module 22 obtains the electrical signal at the moment when or at a predetermined time Δt after the switching circuit 10 enters the first output state (as shown in FIG. 3), that is, $t_{n_{d1}} - t_{n_1} = t_{(n+1)_{d1}} - t_{n+1)_1} = \Delta t$.

In one embodiment, the switching circuit 10 includes a divider resistor (such as the resistor R1 shown in FIG. 2) connected in series with the rain sensor 50, and the first end 11 is connected to the first electrode 51 through the divider resistor R1. In this case, the detection module 22 obtains the electrical signal by detecting the electrical level between the rain sensor 50 and the divider resistor R1. At this time, the electrical signal is a voltage signal (for example, the electrical signal obtained at the moment $t_{n_{d1}}$ can be expressed as $$V_{t_{n_{d1}}}$$

), which indicates the voltage drop on the rain sensor 50 and the divider resistor R1.

In another embodiment, the switching circuit 10 includes a shunt resistor (not shown in the figure) connected in parallel with the rain sensor 50. In this case, the detection module 22 obtains the electrical signal by detecting the current flowing on the rain sensor 50. At this time, the electrical signal is a current signal (for example, the electrical signal obtained at the moment $t_{n_{d1}}$ can be expressed as $$I_{t_{n_{d1}}}$$

), which indicates the current flowing between the first electrode 51 and the second electrode 52 of the rain sensor 50.

The main controller 20 further includes a judgement module 23, configured to determine whether the relationship between the electrical signal and a first threshold is a first relationship. When the switching circuit 10 includes the divider resistor connected in series with the rain sensor 50, the electrical signal is a voltage signal or an electrical level signal, the first threshold is a predetermined voltage threshold or electrical level threshold, and the first relationship can include that the electrical signal is less than or equal to the first threshold. When the switching circuit 10 includes the shunt resistor connected in parallel with the rain sensor 50, the electrical signal is a current signal, the first threshold is a predetermined current threshold, and the first relationship is defined as that the electrical signal is less than or equal to the first threshold. The present invention will be described below by using an example in which a voltage or an electrical level signal is used as the electrical signal.

When it does not rain (there is no rainwater in the groove 54 or the collected rainwater does not conduct the first electrode 51 and the second electrode 52), there is no electrical connection between the first electrode 51 and the second electrode 52, so that the electrical signal $$V_{t_{n_{d1}}}$$

obtained by the detection module 22 is basically equal to the supply voltage $V_{cc}$. On the other hand, when it rains (the rainwater collected in the groove 54 conducts the first electrode 51 and the second electrode 52), an electrical connection is formed between the first electrode 51 and the second electrode 52, so that the electrical signal $$V_{t_{n_{d1}}}$$

by the detection module 22 is significantly lower than the supply voltage $V_{cc}$. Here, the first threshold $V_m$ can be a fixed value or a value proportional to the supply voltage $V_{cc}$, for example, 50% of the supply voltage $V_{cc}$. Generally, a suitable first threshold $V_m$ can be obtained through simulation experiments.

The main controller 20 can further include a behavior control module 24, configured to control the autonomous working apparatus 6100 to change the behavior status when it is determined that the electrical signal $$V_{t_{n_{d1}}}$$

is less than or equal to the first threshold $V_m$. When it is determined that the electrical signal $$V_{t_{n_{d1}}}$$

is less than or equal to the first threshold $V_m$, the behavior control module 24 can control the autonomous working apparatus 6100 to stop working and return to a docking station 6900. More specifically, a working mechanism 30 of the autonomous working apparatus 6100 stops the working status under the control of the behavior control module 24, and a moving mechanism 40 of the autonomous working apparatus 6100 returns to the docking station 6900 under the control of the behavior control module 24. That is to say, when the electrical signal $$V_{t_{n_{d1}}}$$

obtained by the detection module 22 is less than or equal to the first threshold $V_m$, the main controller 20 judges that it is currently raining. In this case, the behavior control module 24 can control the robot to stop working and return to the docking station 6900 to take shelter from rain. In other embodiments, for example, when the autonomous working apparatus 6100 needs to work when it is raining, the autonomous working apparatus enters a standby state when the rain sensor 50 detects that it is not raining, and enters the working status when the rain sensor 50 detects that it is raining.

Further, in order to make the control more accurate, the detection module 22 can successively obtain multiple electrical signals of the rain sensor 50 every two predetermined time intervals T, that is, the detection module obtains the electrical signal once within each cycle C. As shown in FIG. 3, the detection module 22 can obtain the electrical signal $$V_{t_{n_{d1}}}$$

the moment $$t_{n_{d1}}$$

within the cycle $C_n$, obtain the electrical signal $$V_{t_{(n+1)_{d1}}}$$

at the moment $$t_{(n+1)_{d1}}$$

within the cycle $C_{n+1}, \ldots,$ and obtain the electrical signal $$V_{t_{(n+k)_{d1}}}$$

at the moment $$t_{(n+k)_{d1}}$$

within the cycle $C_{n+k}$, wherein n and k both are positive integers greater than or equal to 1. In one example, k=3, The judgement module 23 can determine whether the multiple electrical signals $$V_{t_{n_{d1}}}, V_{t_{(n+1)_{d1}}}, \ldots, V_{t_{(n+k)_{d1}}}$$

are all less than or equal to the first threshold $V_m$, and when it is determined that the multiple electrical signals $$V_{t_{n_{d1}}}, V_{t_{(n+1)_{d1}}}, \ldots, V_{t_{(n+k)_{d1}}}$$

are all less than or equal to the first threshold $V_m$, the behavior control module 24 changes the behavior status of the autonomous working apparatus 6100.

By obtaining the electrical signals within multiple cycles and making judgment, the main controller 20 can more accurately judge whether it is currently in a rainy environment, thereby avoiding erroneous judgement caused by accidental situations (for example, a small amount of other water accidentally falls into the groove 54). Further, the judgement module 23 can also determine whether the multiple electrical signals $$V_{t_{n_{d1}}}, V_{t_{(n+1)_{d1}}}, \ldots, V_{t_{(n+k)_{d1}}}$$

are substantially equal, and the behavior control module 24 can change the behavior status of the autonomous working apparatus 6100 when it is determined that the multiple electrical signals $$V_{t_{n_{d1}}}, V_{t_{(n+1)_{d1}}}, \ldots, V_{t_{(n+k)_{d1}}}$$

are all less than or equal to the first threshold $V_m$ and are substantially equal. In this way, it can also be judged whether the rainfall intensity is stable, thereby further improving the accuracy of the control.

Figure 4:
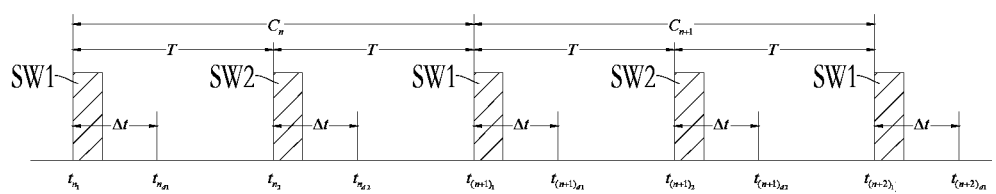
FIG. 4 is a timing diagram of the switching signal according to another embodiment of the present invention.

In the embodiment shown in FIG. 3, the detection module 22 obtains the electrical signal $$V_{t_{n_{d1}}}$$

once within each cycle C. In another embodiment, the detection module 22 can obtain the electrical signal twice within each cycle C. FIG. 4 shows a timing diagram of the switching signal according to another embodiment of the present invention. Similar to FIG. 3, within each cycle C, the switching control module 21 sends a switching signal SW1 and a switching signal SW2 to the switching circuit 10 at the moment $t_{n_1}$ and the moment $t_{n_2}$ respectively. Different from FIG. 3, the detection module 22 not only obtains the first electrical signal $$V_{t_{n_{d1}}}$$

of the rain sensor 50 at the moment when or at a predetermined time Δt after the switching circuit 10 enters the first output state, but also obtains the second electrical signal $$V_{t_{n_{d2}}}$$

of the rain sensor 50 at the moment when the switching circuit 10 enters the second output state or at the predetermined time Δt afterward (as shown in FIG. 4). The judgement module 23 determines whether the sum value of the first electrical signal $$V_{t_{n_{d1}}}$$

and the second electrical signal $$V_{t_{n_{d2}}}$$

is equal to a first preset value. In this embodiment, the first preset value specifically refers to the voltage $V_{cc}$ of the power supply. The voltage $V_{cc}$ of the power supply described here generally refers to the sum value of the voltages loaded on the rain sensor 50 and the divider resistor. The voltage $V_{cc}$ of the power supply or the supply voltage $V_{cc}$ is exemplarily described below. When it is determined that the electrical signal $$V_{t_{n_{d1}}}$$

(i.e., the first electrical signal $$V_{t_{n_{d1}}}$$

) is less than or equal to the first threshold $V_m$ and the sum value of the first electrical signal $$V_{t_{n_{d1}}}$$

and the second electrical signal $$V_{t_{n_{d2}}}$$

is equal to the voltage $V_{cc}$ of the power supply, the behavior control module 24 changes the behavior status of the autonomous working apparatus 6100. In other words, the sum value of the two electrical signals measured after the same period of time after the polarity reversal of the electrodes 51 and 52 should be equal to the supply voltage $V_{cc}$, thereby further improving the accuracy of the measurement.

In the embodiment shown in FIG. 3 and FIG. 4, each cycle C is displayed as twice of the predetermined time interval T, that is, after the switching circuit 10 is in the second output state for the predetermined time interval T, the switching circuit 10 immediately enters the next cycle and is in the first output state under the control of the signal SW1. However, in a further embodiment of the present invention, when the switching circuit 10 is in the second output state for the predetermined time interval T (at the moment after the duration of the time interval T after the moment $t_{n_2}$ shown in FIG. 3 and FIG. 4), the first end 11 and the second end 12 are grounded for a predetermined time period δ. Here, the predetermined time period δ can be a value that is much less than the predetermined time interval T. In this way, both the first electrode 51 and the second electrode 52 are grounded during the time period δ, so that electric charges near the first electrode 51 and the second electrode 52 are dissipated.

As described above, the judgement module 23 can determine whether the electrical signal $$V_{t_{n_{d1}}}$$

obtained by the detection module 22 is equal to the voltage $V_{cc}$ of the power supply. When the electrical signal $$V_{t_{n_{d1}}}$$

by the detection module 22 is equal to the voltage $V_{cc}$ of the power supply, there is no rainwater in the groove 54 of the rain sensor 50. This can be divided into two situations, one is that it has never rained, and the other is that it has rained before, and the rain has stopped for a period of time, and all the accumulated water in the groove 54 has been discharged or evaporated. In this case, in some further embodiments, the behavior control module 24 can further determine whether the behavior status of the autonomous working apparatus 6100 is a working status or a stop status. If it is determined that the autonomous working apparatus 6100 is in the stop status, the behavior control module 24 can control the autonomous working apparatus 6100 to enter the working status. For example, when the autonomous working apparatus 6100 detects that the electrical signal $$V_{t_{n_{d1}}}$$

of the rain sensor 50 is restored to the supply voltage $V_{cc}$ after it stops working due to rain, it can be determined that the rain has stopped and the rainwater in the groove 54 has been completely discharged or evaporated, and the external environment becomes suitable for the autonomous work apparatus 6100 to work again. In this case, the autonomous working apparatus 6100 can be put into work again by determining the current behavior status of the autonomous working apparatus 6100 and changing the behavior status from the stop status to the working status. At this time, the moving mechanism 40 of the autonomous working apparatus 6100 departs from the docking station 6900 under the control of the behavior control module 24, and the working mechanism 30 of the autonomous working apparatus 6100 starts the working status under the control of the behavior control module 24.

Figure 5:
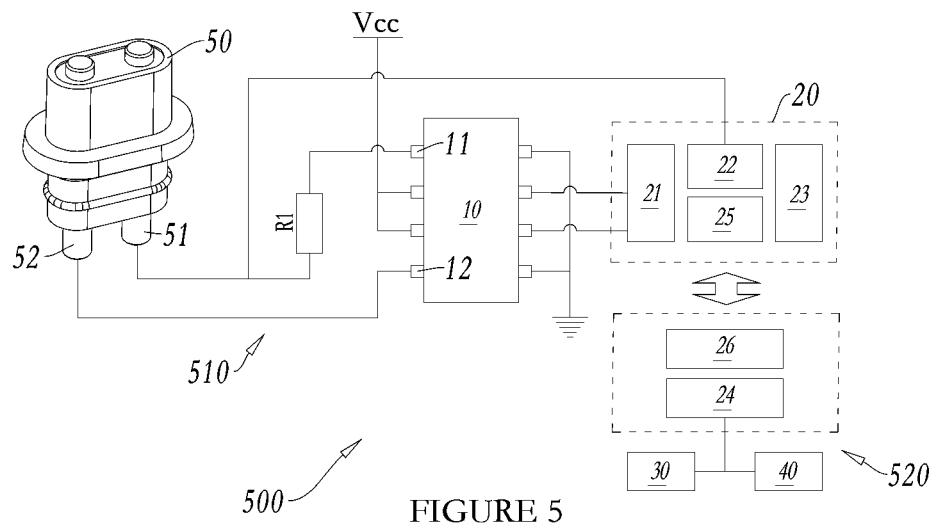
FIG. 5 is a schematic diagram of the structure of a control circuit for an autonomous working apparatus according to some further embodiments of the present invention.

FIG. 5 shows a schematic structural diagram of a control circuit 500 for autonomous working apparatus according to some other embodiments of the present invention. In these embodiments, the rain sensor 50 can be arranged on second apparatus that is independent of the autonomous working apparatus, the second apparatus is exemplarily the docking station 6900 shown in FIG. 18 or another independent apparatus, and the second apparatus can be dedicated to detecting whether it is raining or can also have other functions such as signal transmission. In some embodiments, the second apparatus is fixedly arranged on the ground, a building or a structure. In some other embodiments, the second apparatus can also be arranged on other robots, for example, if the autonomous working system includes an aircraft (typically such as a drone, which is usually used for monitoring the working area), the second apparatus can be the aircraft, that is, the control circuit 500 can be arranged on the aircraft. In addition, if the autonomous working system includes multiple pieces of autonomous working apparatus 6100, the second apparatus can be at least one of the multiple pieces of autonomous working apparatus 6100, that is, the control circuit 500 can be arranged on at least one of the multiple pieces of autonomous working apparatus 6100, and at least one autonomous working apparatus 6100 has no control circuit 500. For example, it can be advantageously arranged on a type of autonomous working apparatus that does not have to stop working when it rains. Hereinafter, it is taken as an example for description that the rain sensor 50 is arranged in the docking station 6900. The entire control circuit 500 can include a part 510 in the docking station 6900 and a part 520 in the autonomous working apparatus 6100. Here, as described below, the main control function is implemented by the part 510 in the docking station 6900, so 510 can also be referred to as a control circuit for controlling the autonomous working apparatus 6100. The following description will focus on the differences between the control circuit 510 shown in FIG. 5 and the control circuit 200 shown in FIG. 2, and the description of the same parts will be omitted.

Similar to FIG. 2, the control circuit 510 includes a switching circuit 10 and a main controller 20 connected to the switching circuit 10. The switching circuit 10 includes a first end 11 and a second end 12, wherein the first end 11 and the second end 12 are respectively connected to the first electrode 51 and the second electrode 52 of the rain sensor 50 installed on the autonomous working apparatus 6100. Here, the first electrode 51 and the second electrode 52 can have different polarities by applying a voltage to the first electrode 51 and the second electrode 52. As shown in FIG. 5, the first electrode 51 and the second electrode 52 are arranged on the insulating base 53 of the rain sensor 50 at intervals and penetrate through the base 53. When it rains, the rainwater collected in the groove 54 on the top of the base 53 will conduct the first electrode 51 and the second electrode 52 to form an electrical path. In one embodiment, the switching circuit 10 includes an H-bridge circuit, as shown in FIG. 7. More specifically, the switching circuit 10 can be an H-bridge integrated chip, such as L9100S.

The main controller 20 can be implemented on a single chip microcomputer or a single chip, and can also be implemented on multiple single chip microcomputers or multiple chips. The main controller 20 can include a switching control module 21, configured to send a switching signal to the switching circuit 10 every predetermined time interval to exchange the polarities of the first electrode 51 and the second electrode 52 of the rain sensor 50. The timing diagram of the switching signal is shown in FIG. 3 and FIG. 4 and is described above in conjunction with FIG. 2, and thus will not be repeated here.

The main controller 20 further includes a detection module 22, configured to obtain an electrical signal of the rain sensor 50 within the predetermined time interval T. As shown in FIG. 3, it is assumed that within the cycle $C_n$, the detection module 22 detects the electrical signal of the rain sensor 50 at the moment $t_{n_{d1}}$ after the moment $t_{n_1}$. According to the embodiment of the present invention, in order to maintain the consistency of measurement, within each cycle C, the detection module 22 obtains the electrical signal at the moment when or at a predetermined time $\Delta t$ after the switching circuit 10 enters the first output state, that is, $t_{n_{d1}} - t_{n_1} = t_{(n+1)_{d1}} - t_{(n+1)_1} = \Delta t$.

Similarly, in one embodiment, the switching circuit 10 includes a divider resistor (such as the resistor R1 shown in FIG. 5) connected in series with the rain sensor 50, and the first end 11 is connected to the first electrode 51 through the divider resistor R1. In this case, the detection module 22 obtains the electrical signal by detecting the electrical level between the rain sensor 50 and the divider resistor R1. At this time, the electrical signal is a voltage signal (for example, the electrical signal obtained at the moment $t_{n_{d1}}$ can be expressed as $$V_{t_{n_{d1}}}$$

), which indicates the voltage drop on the rain sensor 50 and the divider resistor R1.

In another embodiment, the switching circuit 10 includes a shunt resistor (not shown in the figure) connected in parallel with the rain sensor 50. In this case, the detection module 22 obtains the electrical signal by detecting the current flowing on the rain sensor 50. At this time, the electrical signal is a current signal (for example, the electrical signal obtained at the moment $t_{n_{d1}}$ can be expressed as $$I_{t_{n_{d1}}}$$

), which indicates the current flowing between the first electrode 51 and the second electrode 52 of the rain sensor 50.

Similar to the embodiment shown in FIG. 2, the main controller 20 can further include a judgement module 23, configured to determine whether the relationship between the electrical signal and a first threshold $V_m$ is a first relationship. When the switching circuit 10 includes the divider resistor connected in series with the rain sensor 50, the electrical signal is a voltage signal or an electrical level signal, the first threshold is a predetermined voltage threshold or electrical level threshold, and the first relationship can include that the electrical signal is less than or equal to the first threshold. When the switching circuit 10 includes the shunt resistor connected in parallel with the rain sensor 50, the electrical signal is a current signal, the first threshold is a predetermined current threshold, and the first relationship can include that the electrical signal is less than or equal to the first threshold. The present invention will be described below by using an example in which a voltage or an electrical level signal is used as the electrical signal.

Unlike the embodiment shown in FIG. 2, the main controller 20 does not include the behavior control module 24, but includes a first communication module 25, wherein the first communication module 25 is configured to send a command signal to the autonomous working apparatus 6100 when it is determined that the relationship between the electrical signal $$V_{t_{n_{d1}}}$$

and the first threshold $V_m$ is the first relationship, so that the autonomous working apparatus 6100 changes the behavior status. Here, the first communication module 25 and the autonomous working apparatus 6100 (more specifically, a second communication module 26 of the autonomous working apparatus 6100) can communicate with each other through a general or dedicated communication mode. For example, the first communication module and the autonomous working apparatus can be connected and communicate with each other through wireless communication modes such as WiFi and Bluetooth. Or, the first communication module and the autonomous working apparatus can also communicate with each other through boundary signals with specific laws, which will not be repeated here.

The autonomous working apparatus 6100 includes a second communication module 26, configured to receive the command signal from the first communication module 25, and the autonomous working apparatus further includes a behavior control module 24, configured to change the behavior status of the autonomous working apparatus 6100 according to the command signal. For example, the behavior control module 24 can control the autonomous working apparatus 6100 to stop working and return to the docking station 6900. More specifically, the working mechanism 30 of the autonomous working apparatus 6100 stops the working status under the control of the behavior control module 24, and the moving mechanism 40 of the autonomous working apparatus 6100 returns to the docking station 6900 under the control of the behavior control module 24. In some embodiments, when the electrical signal $$V_{t_{n_{d1}}}$$

obtained by the detection module 22 is less than or equal to the first threshold $V_m$, the docking station 6900 judges that it is currently raining. In this case, the docking station 6900 sends a control command to the autonomous working apparatus 6100 to control the robot to stop working and return to the docking station 6900 to take shelter from rain. In other embodiments, for example, when the autonomous working apparatus 6100 needs to work when it is raining, the command signal is sent to cause the autonomous working apparatus 6100 to enter the standby state when the rain sensor 50 detects that it is not raining, and the command signal is sent to cause the autonomous working apparatus 6100 to enter the working status when the rain sensor 50 detects that it is raining.

Further, similar to the embodiment shown in FIG. 2, in order to make the control more accurate, the detection module 22 can successively obtain multiple electrical signals of the rain sensor 50 every two predetermined time intervals T, that is, the detection module obtains the electrical signal once within each cycle C. The judgement module 23 can determine whether the multiple electrical signals are all less than or equal to the first threshold $V_m$, and when it is determined that the multiple electrical signals are all less than or equal to the first threshold $V_m$, the first communication module 25 sends the command signal to the autonomous working apparatus 6100.

Further, the judgement module 23 can also determine whether the multiple electrical signals are substantially equal, and the first communication module 25 can send the command signal to the autonomous working apparatus 6100, when it is determined that the multiple electrical signals are all less than or equal to the first threshold $V_m$ and are substantially equal.

As shown in FIG. 4, in addition to obtaining the first electrical signal $$V_{t_{n_{d1}}}$$

the rain sensor 50 at the moment when or at a predetermined time Δt after the switching circuit 10 enters the first output state, the detection module 22 can also correspondingly obtain the second electrical signal $$V_{t_{n_{d2}}}$$

of the rain sensor 50 at the moment when the switching circuit 10 enters the second output state or at the predetermined time Δt afterward. The judgement module 23 determines whether the sum value of the first electrical signal $$V_{t_{n_{d1}}}$$

and the second electrical signal $$V_{t_{n_{d2}}}$$

is equal to a first preset value, and when it is determined that the electrical signal $$V_{t_{n_{d1}}}$$

(i.e., the first electrical signal $$V_{t_{n_{d1}}}$$

) is less than or equal to the first threshold $V_m$ and the sum value of the first electrical signal $$V_{t_{n_{d1}}}$$

and the second electrical signal $$V_{t_{n_{d2}}}$$

equal to the first preset value, the first communication module 25 sends the command signal to the autonomous working apparatus 6100 to change the behavior status of the autonomous working apparatus 6100. Here, the first preset value can refer to the voltage $V_{cc}$ of the power supply. That is to say, the sum value of the two electrical signals measured after the same period of time after the polarity reversal of the electrodes 51 and 52 should be equal to the supply voltage $V_{cc}$, thereby further improving the accuracy of the measurement.

Similarly, in a further embodiment of the present invention, when the switching circuit 10 is in the second output state for the predetermined time interval T (at the moment after the duration of the time interval T after the moment $t_{n_2}$ shown in FIG. 3 and FIG. 4), the first end 11 and the second end 12 are grounded for a predetermined time period δ.

As described above, the judgement module 23 can determine whether the electrical signal $$V_{t_{n_{d1}}}$$

obtained by the detection module 22 is equal to the voltage $V_{cc}$ of the power supply. When the electrical signal $$V_{t_{n_{d1}}}$$

by the detection module 22 is equal to the voltage $V_{cc}$ of the power supply, there is no rainwater in the groove 54 of the rain sensor 50. This can be divided into two situations, one is that it has never rained, and the other is that it has rained before, and the rain has stopped for a period of time, and all the accumulated water in the groove 54 has been discharged or evaporated. In this case, in some further embodiments, the first communication module 25 can further determine whether the behavior status of the autonomous working apparatus 6100 is a working status or a stop status. If it is determined that the autonomous working apparatus 6100 is in the stop status, the first communication module 25 can send the command signal to the autonomous working apparatus 6100. For example, when the autonomous working apparatus 6100 detects that the electrical signal $$V_{t_{n_{d1}}}$$

of the rain sensor 50 is restored to the supply voltage $V_{cc}$ after it stops working due to rain, it can be determined that the rain has stopped and the rainwater in the groove 54 has been completely discharged or evaporated, and the external environment becomes suitable for the autonomous work apparatus 6100 to work again. In this case, the autonomous working apparatus 6100 can be put into work again by determining the current behavior status of the autonomous working apparatus 6100 and changing it from the stop status to the working status. At this time, the behavior control module 24 can change the behavior status of the autonomous working apparatus 6100 according to the command signal. Specifically, the moving mechanism 40 of the autonomous working apparatus 6100 can depart from the docking station 6900 under the control of the behavior control module 24, and the working mechanism 30 of the autonomous working apparatus 6100 can start the working status under the control of the behavior control module 24.

The embodiment shown in FIG. 5 can be an alternative to the embodiment shown in FIG. 2 (that is, the rain sensor is only installed on the docking station 6900, but is not installed on the autonomous operation apparatus 6100) or a supplement (that is, the rain sensors are installed on both of the autonomous operation apparatus 6100 and the docking station 6100). In some cases, this is advantageous. For example, in the case that the docking station 6900 is provided with a shelter, when the autonomous working apparatus 6100 stops at the docking station 6900, it may not be able to accurately judge whether the rain stops, and thus the behavior status of the autonomous working apparatus cannot be controlled accurately.

Figure 6:
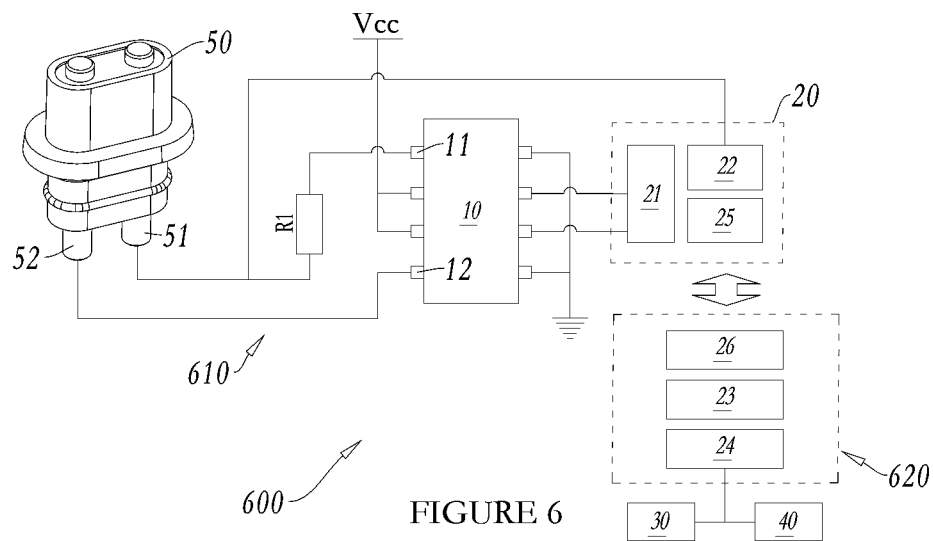
FIG. 6 is a schematic diagram of the structure of a control circuit for an autonomous working apparatus according to some further embodiments of the present invention.

FIG. 6 shows a schematic structural diagram of a control circuit 600 for autonomous working apparatus according to still some other embodiments of the present invention. Similar to the embodiment shown in FIG. 5, the rain sensor 50 can be arranged on second apparatus that is independent of the autonomous working apparatus 6100, the second apparatus is exemplarily the docking station 6900 shown in FIG. 1 or another independent apparatus, and the second apparatus can be dedicated to detecting whether it is raining or can also have other functions such as signal transmission. Hereinafter, it is taken as an example for description that the rain sensor 50 is arranged in the docking station 6900. The entire control circuit 600 can include a part 610 in the docking station 6900 and a part 620 in the autonomous working apparatus 6100. Different from the embodiment in FIG. 5, the control function is cooperatively implemented by the part 610 in the docking station 6900 and the part 620 in the autonomous working apparatus 6100, for example, the judgement module 23 is located in the autonomous working apparatus 6100 instead of the docking station 6900. The following description will focus on the differences between the control circuit 600 shown in FIG. 6 with the control circuit 200 shown in FIG. 2 and the control circuit 500 shown in FIG. 5, and the description of the same parts will be omitted Similar to FIG. 2 and FIG. 5, the control circuit part 610 of the docking station 6900 includes a switching circuit 10 and a main controller 20 connected to the switching circuit 10. The switching circuit 10 includes a first end 11 and a second end 12, wherein the first end 11 and the second end 12 are respectively connected to the first electrode 51 and the second electrode 52 of the rain sensor 50 installed on the autonomous working apparatus 6100. Here, the first electrode 51 and the second electrode 52 can have different polarities by applying a voltage to the first electrode 51 and the second electrode 52. As shown in FIG. 6, the first electrode 51 and the second electrode 52 are arranged on the insulating base 53 of the rain sensor 50 at intervals and penetrate through the base 53. When it rains, the rainwater collected in the groove 54 on the top of the base 53 will conduct the first electrode 51 and the second electrode 52 to form an electrical path. In one embodiment, the switching circuit 10 includes an H-bridge circuit. More specifically, the switching circuit 10 can be an H-bridge integrated chip, such as L9100S.

The main controller 20 can be implemented on a single chip microcomputer or a single chip, and can also be implemented on multiple single chip microcomputers or multiple chips. The control circuit part 620 (the second communication module 26, the judgement module 23 and the behavior control module 24) can be implemented on another or some other single-chip microcomputers or chips. The main controller 20 can include a switching control module 21, configured to send a switching signal to the switching circuit 10 every predetermined time interval to exchange the polarities of the first electrode 51 and the second electrode 52 of the rain sensor 50. The timing diagram of the switching signal is shown in FIG. 3 and FIG. 4 and is described above in conjunction with FIG. 2 and FIG. 5, and thus will not be repeated here.

The main controller 20 further includes a detection module 22, configured to obtain an electrical signal of the rain sensor 50 within the predetermined time interval T. As shown in FIG. 3, it is assumed that within the cycle $C_n$, the detection module 22 detects the electrical signal of the rain sensor 50 at the moment $t_{n_{d1}}$ after the moment $t_{n_1}$. According to the embodiment of the present invention, in order to maintain the consistency of measurement, within each cycle C, the detection module 22 obtains the electrical signal at the moment when or at a predetermined time $\Delta t$ after the switching circuit 10 enters the first output state, that is, $t_{n_{d1}} - t_{n_1} = t_{(n+1)_{d1}} - t_{(n+1)_1} = \Delta t$.

Similarly, in one embodiment, the switching circuit 10 includes a divider resistor (such as the resistor R1 shown in FIG. 6) connected in series with the rain sensor 50, and the first end 11 is connected to the first electrode 51 through the divider resistor R1. In this case, the detection module 22 obtains the electrical signal by detecting the electrical level between the rain sensor 50 and the divider resistor R1. At this time, the electrical signal is a voltage signal (for example, the electrical signal obtained at the moment $t_{n_{d1}}$ can be expressed as $$V_{t_{n_{d1}}}$$

), which indicates the voltage drop on the rain sensor 50 and the divider resistor R1.

In another embodiment, the switching circuit 10 includes a shunt resistor (not shown in the figure) connected in parallel with the rain sensor 50. In this case, the detection module 22 obtains the electrical signal by detecting the current flowing on the rain sensor 50. At this time, the electrical signal is a current signal (for example, the electrical signal obtained at the moment $t_{n_{d1}}$ can be expressed as $$I_{t_{n_{d1}}}$$

), which indicates the current flowing between the first electrode 51 and the second electrode 52 of the rain sensor 50.

Different from the embodiment shown in FIG. 2, the main controller 20 does not include the judgement module 23, but includes a first communication module 25, which directly sends the electrical signal $$V_{t_{n_{d1}}}$$

by the detection module 22 to the autonomous working apparatus 6100.

The autonomous working apparatus 6100 includes a second communication module 26, configured to receive the electrical signal $$V_{t_{n_{d1}}}$$

from the first communication module 25, and the autonomous working apparatus further includes a judgement module 23, configured to determine whether the relationship between the electrical signal $$V_{t_{n_{d1}}}$$

a first threshold $V_m$ is a first relationship. When the switching circuit 10 includes the divider resistor connected in series with the rain sensor 50, the electrical signal is a voltage signal or an electrical level signal, the first threshold is a predetermined voltage threshold or electrical level threshold, and the first relationship can include that the electrical signal is less than or equal to the first threshold. When the switching circuit 10 includes the shunt resistor connected in parallel with the rain sensor 50, the electrical signal is a current signal, the first threshold is a predetermined current threshold, and the first relationship can include that the electrical signal is less than or equal to the first threshold. The present invention will be described below by using an example in which a voltage or an electrical level signal is used as the electrical signal.

The autonomous working apparatus 6100 further includes a behavior control module 24, configured to change the behavior status of the autonomous working apparatus 6100 when it is determined that the relationship between the electrical signal $$V_{t_{n_{d1}}}$$

and the first threshold $V_m$ is the first relationship. For example, the behavior control module 24 can control the autonomous working apparatus 6100 to stop working and return to the docking station 6900. More specifically, the working mechanism 30 of the autonomous working apparatus 6100 stops the working status under the control of the behavior control module 24, and the moving mechanism 40 of the autonomous working apparatus 6100 returns to the docking station 6900 under the control of the behavior control module 24. In some embodiments, when the electrical signal $$V_{t_{n_{d1}}}$$

by the detection module 22 is less than or equal to the first threshold $V_m$, the autonomous working apparatus 6100 judges that it is currently raining. In this case, the behavior control module 24 of the autonomous working apparatus 6100 controls the robot to stop working and return to the docking station 6900 to take shelter from rain. In other embodiments, for example, when the autonomous working apparatus 6100 needs to work when it is raining, a command signal is sent to cause the autonomous working apparatus 6100 to enter the standby state when the rain sensor 50 detects that it is not raining, and the command signal is sent to cause the autonomous working apparatus 6100 to enter the working status when the rain sensor 50 detects that it is raining.

Further, similar to the embodiment shown in FIG. 2 and FIG. 5, in order to make the control more accurate, the detection module 22 can successively obtain multiple electrical signals of the rain sensor 50 every two predetermined time intervals T, that is, the detection module obtains the electrical signal once within each cycle C. The first communication module 25 can send the multiple electrical signals to the autonomous working apparatus 6100, and the judgement module 23 of the autonomous working apparatus 6100 can determine whether the multiple electrical signals are all less than or equal to the first threshold $V_m$, and when it is determined that the multiple electrical signals are all less than or equal to the first threshold $V_m$, the behavior control module 24 changes the behavior status of the autonomous working apparatus 6100.

Further, the judgement module 23 can also determine whether the multiple electrical signals are substantially equal, and the behavior control module 24 can change the behavior status of the autonomous working apparatus 6100, when it is determined that the multiple electrical signals are all less than or equal to the first threshold $V_m$ and are substantially equal.

As shown in FIG. 4, in addition to obtaining the first electrical signal $$V_{t_{n_{d1}}}$$

the rain sensor 50 at the moment when or at a predetermined time Δt after the switching circuit 10 enters the first output state, the detection module 22 can also correspondingly obtain the second electrical signal $$V_{t_{n_{d2}}}$$

of the rain sensor 50 at the moment when the switching circuit 10 enters the second output state or at the predetermined time Δt afterward. The first communication module 25 can send the first electrical signal $$V_{t_{n_{d1}}}$$

and the second electrical signal $$V_{t_{n_{d2}}}$$

to the autonomous working apparatus 6100.

The second communication module 26 of the autonomous working apparatus 6100 receives the first electrical signal $$V_{t_{n_{d1}}}$$

and the second electrical signal $$V_{t_{n_{d2}}}$$

from the first communication module 25, the judgement module 23 determines whether the sum value of the first electrical signal $$V_{t_{n_{d1}}}$$

and the second electrical signal $$V_{t_{n_{d2}}}$$

is equal to a first preset value, and when it is determined that the electrical signal $$V_{t_{n_{d1}}}$$

(i.e., the first electrical signal $$V_{t_{n_{d1}}}$$

) is less than or equal to the first threshold $V_m$ and the sum value of the first electrical signal $$V_{t_{n_{d1}}}$$

and the second electrical signal $$V_{t_{n_{d2}}}$$

is equal to the first preset value, the behavior control module 24 changes the behavior status of the autonomous working apparatus 6100. Here, the first preset value can refer to the voltage $V_{cc}$ of the power supply. That is to say, the sum value of the two electrical signals measured after the same period of time after the polarity reversal of the electrodes 51 and 52 should be equal to the supply voltage $V_{cc}$, thereby further improving the accuracy of the measurement.

Similarly, in a further embodiment of the present invention, when the switching circuit 10 is in the second output state for the predetermined time interval T (at the moment after the duration of the time interval T after the moment $t_{n_2}$ shown in FIG. 3 and FIG. 4), the first end 11 and the second end 12 are grounded for a predetermined time period δ.

As described above, the judgement module 23 can determine whether the electrical signal $$V_{t_{n_{d1}}}$$

obtained by the detection module 22 is equal to the voltage $V_{cc}$ of the power supply. When the electrical signal $$V_{t_{n_{d1}}}$$

by the detection module 22 is equal to the voltage $V_{cc}$ of the power supply, there is no rainwater in the groove 54 of the rain sensor 50. This can be divided into two situations, one is that it has never rained, and the other is that it has rained before, and the rain has stopped for a period of time, and all the accumulated water in the groove 54 has been discharged or evaporated. In this case, in some further embodiments, the behavior control module 24 can further determine whether the behavior status of the autonomous working apparatus 6100 is a working status or a stop status. If it is determined that the autonomous working apparatus 6100 is in the stop status, the behavior control module 24 controls the autonomous working apparatus 6100 to enter the working status. For example, when the autonomous working apparatus 6100 detects that the electrical signal $$V_{t_{n_{d1}}}$$

of the rain sensor 50 is restored to the supply voltage $V_{cc}$ after it stops working due to rain, it can be determined that the rain has stopped and the rainwater in the groove 54 has been completely discharged or evaporated, and the external environment becomes suitable for the autonomous work apparatus 6100 to work again. In this case, the autonomous working apparatus 6100 can be put into work again by determining the current behavior status of the autonomous working apparatus 6100 and changing the behavior status from the stop status to the working status. At this time, the moving mechanism 40 of the autonomous working apparatus 6100 can depart from the docking station 6900 under the control of the behavior control module 24, and the working mechanism 30 of the autonomous working apparatus 6100 can start the working status under the control of the behavior control module 24.

The embodiment shown in FIG. 6 is a modification of the embodiment shown in FIG. 5, in which the control function of the entire system is dispersed in two parts: the autonomous working apparatus 6100 and the docking station 6900 (or another independent apparatus), which may be advantageous if the autonomous working apparatus itself has relatively strong processing capability.

The present invention can be implemented as a method, apparatus, a chip circuit, and/or a computer program product. The computer program product can include a computer-readable storage medium, which carries computer-readable program instructions for executing various aspects of the present invention. The chip circuit can include circuit units for executing the various aspects of the present invention.

In the prior art, the rain sensor is usually installed in an unsealed space of the apparatus, a control panel is installed in a sealed space of the apparatus, and the rain sensor and the control panel are connected by a conducting wire. In this design solution, two aspects of sealing need to be considered, including the own sealing of the rain sensor and the sealing of the conducting wire. The rain sensor includes a base, a rubber part located below the base, and an electrode bar penetrating through the base. The base is used as the basic supporting element and is made of a harder plastic material. It is difficult to form reliable sealing between the base made of the plastic material and the electrode bar made of a metal material rod, regardless of whether the two components are integrally formed by injection molding or through interference connection. In this way, water will seep into the lower side of the base, so that the electrode bar is always conducted, resulting in spurious triggering of the rain sensor. The reason is that the thermal expansion and contraction characteristics of the two components are different, such that a gap is very likely to occur in the interface of the two components or the plastic part is cracked. In order to solve the above-mentioned problems, the rubber part is arranged below the base, the electrode bar and the conducting wire are embedded in the rubber part, or potting adhesive is used for potting. The conducting wire passes through a wire pass hole between the sealed space and the unsealed space for sealing, and then the position of the wire pass hole needs to be sealed. The above technical solution leads to a complex result of the rain sensor, and the rain sensor uses at least three materials, which makes it difficult to balance reliability, assembly convenience and low cost. In view of the above technical problems, as shown in FIGS. 1-14, this embodiment further provides a rain sensor 640 and autonomous working apparatus 6100 provided with the rain sensor 640, especially an intelligent lawn mower capable of autonomously walking in a preset area and executing mowing operations.

Figure 14:
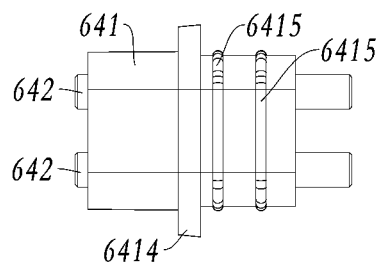
FIG. 14 is a left view of FIG. 12.

First, the rain sensor 640 provided in this embodiment will be described in detail. Referring to FIGS. 12-14, in this embodiment, the rain sensor 640 includes a base 641 and an electrode 642 embedded in the base 641. In an optimal embodiment, the electrode 642 and the base 641 are joined by vulcanization bonding. This connection mode can ensure the sealing property of the connection part of the electrode 642 and the base 641, and prevent water from penetrating into the sealed cavity from the interface between the two components. In other embodiments, the electrode 642 and the base 641 are joined by interference fit. The base 641 has elasticity and can ensure the sealing performance, and is preferably made of a rubber material. The electrode 642 is rod-shaped, and can be a separate metal rod or is a composed of a metal rod and a conducting wire welded to the lower end of the metal rod. In this embodiment, preferably, the electrode 642 is a separate metal rod. The number of electrodes 642 is two, which are respectively a positive electrode and a negative electrode arranged at intervals. As the optimal solution of this embodiment, the rain sensor 640 is only composed of the base 641 and the electrode 642, and the electrode 642 is a separate metal rod, so the entire rain sensor 640 is only composed of a rubber material and a metal material, which reduces the manufacturing cost to the greatest extent.

The base 641 has an upper end face 6411 and a lower end face 6412, which are opposite to each other. The lower end face 6412 is intended to be exposed to the inside of a sealed cavity c, and the upper end face 6411 is intended to be exposed to the outside of the sealed cavity c. The two ends of the electrode 642 respectively penetrate through the upper end face 6411 and the lower end face 6412, the upper end of the electrode 642 is intended to be exposed to the outside of a sealed space c to touch the rain, and the lower end of the electrode 642 is intended to connect with the control panel 660 in the sealed space c. During the working process of the apparatus, the rain sensor 640 is used for detecting whether it is exposed to the rain, when the two electrodes 642 are conducted by the rain, the control panel 660 can detect an electrode conduction signal, and then automatically stop working or send a reminding signal according to the signal.

The base 641 has a peripheral surface 6413 configured between the upper end face 6211 and the lower end face 6412, and the peripheral surface 6413 can be a circumferential surface, a regular circumferential surface or an irregular circumferential surface of a polygonal circumferential surface. A protruding supporting structure 6414 is configured on the peripheral surface 6413, the base 641 is supported by the supporting structure 6414 on an upper cover hole 6111 of an upper chassis cover 610 that serves as a component of the sealed cavity c, and the lower end area can extend into the upper cover hole 6111, so that the lower end face 6412 is exposed in the sealed cavity c. On the other hand, the supporting structure 6414 on the peripheral surface 6413 can be used for supporting other structures placed at the outside of the sealing structure, for example, a cover body 630 located above the upper chassis cover 610, the cover body 630 itself can be supported on the supporting structure 6414 by using a cover body hole 6311 on the cover body, at the same time, the upper end area of the supporting structure 6414 extends into the cover body hole 6311, so that the upper end face 6411 of the base 641 is exposed to the outside of the sealed cavity c. By configuring the supporting structure 6414 on the peripheral surface 6413 of the base 641, the rain sensor 640 is clamped and pressed on the sealing structure, thus ensuring the optimal assembly and reliability of the rain sensor 640.

The supporting structure 6414 has a variety of optional solutions. The supporting structure can be a supporting flange extending continuously along the circumferential direction of the peripheral surface 6413 of the base 641, and the supporting flange is flaky or has a certain thickness; or the supporting structure 6414 is composed of a plurality of supporting portions distributed at intervals along the circumferential direction of the peripheral surface 6413 of the base 641, and the supporting portions can be columnar, flaky or other shapes. As a preferred solution of this embodiment, the supporting structure 6414 is a supporting flange extending along the circumferential direction of the peripheral surface 6413, the supporting flange has a certain thickness, the upper surface of the supporting flange is configured with a water guide groove extending from the inner edge of the flange toward the outer edge, and preferably, the water guide groove extends linearly along the radial direction of the flange, wherein the number of flanges is one or two. When the number of flanges is one, the above-mentioned upper chassis cover 610 and a fixing plate 630 compress the flange along the thickness direction of the flange. When the number of flanges is two, the above-mentioned upper chassis cover 610 is in contact with the lower surface of the flange located below, so that the base 641 is supported on the upper cover hole 6111 of the upper chassis cover 610, and the above-mentioned cover body 630 is in contact with the upper surface of the flange located above to be supported on the flange, and the water guide groove is configured on the upper surface of the flange located above.

In this embodiment, the peripheral surface 6413 is configured with at least one protrusion 6415 that extends along the circumferential direction of the peripheral surface 6413 and protrudes from the peripheral surface 6413, the protrusion 6415 is configured to be ring-shaped, the protrusion 6415 is located below the supporting structure 6414, and the at least one protrusion 6415 are arranged at intervals along the height direction of the base 641. The upper cover hole 6111 of the upper chassis cover 610 is stretched upward from the surface of the upper chassis cover 610 to form a first supporting portion 611, and the protrusion 6415 is used for matching the inner wall of the first supporting portion 611 to achieve a sealing effect.

In this embodiment, the upper end face 6411 of the base 641 is configured with a concave water collection surface 6416, the upper end of the electrode 642 passes through the water collection surface 6416, the water collection surface 6416 is recessed on the upper end face 6411 to form a depression, which is conducive to collecting the rain. In turn, the sensitivity of the electrode 642 is improved.

In this embodiment, the periphery of the positive electrode and the periphery of the negative electrode are configured with multiple cones attached to the water collection surface 6416, and the gaps among the multiple cones communicate with each other and form a water storage space together, and the water storage space is configured to be able to store water and form a water film connecting the positive electrode and the negative electrode. When there is rain directly above the rain sensor 640, since the cone has an upward tip, and the tip can break the surface tension of a raindrop, then it is not easy to form large water droplets on the water collection surface, the raindrops are forced to disperse quickly, and then the water film capable of conducting the positive electrode and the negative electrode can be formed, so as to achieve rapid triggering. In one embodiment, the cone is integrally formed on the water collection surface 6416. In one embodiment, multiple cones are connected into an integrated rain collection structure, the rain collection structure is attached to the water collection surface 6416, the rain collection structure is provided with a longitudinal channel for the positive electrode and the negative electrode to pass through, and the positive electrode and the negative electrode pass through the longitudinal channel to extend out the upper end face 6411 of the base 641. Preferably, the rain collection structure is detachably fixed on the water collection surface 6416 for easy replacement. For example, the rain collection structure can be clamped on the water collection surface 6416 through a concave-convex structure. Or, the detachable connection can be realized by gluing. Preferably, the cone is a triangular pyramid or a quadrangular pyramid. Multiple cones are arranged at intervals or the bottoms are adjacent to each other. There are gaps among the cones, and the cones are independent of each other and form the gaps, that is, there is no contact between adjacent cones. When the cones are connected to form the rain collection structure, the cones are connected together by a connecting portion. Or, there are gaps among the cones, and the gaps are formed when the bottoms of the adjacent cones are in contact with each other. If the cones form the integrated rain collection structure, and the connection is realized only through the bottoms which are in contact with each other. In one embodiment, the density of the top ends of the multiple cones on the water collection surface 6416 is greater than 100 per square centimeter. The cones distributed at this density can effectively destroy the surface tension of water droplets with a diameter greater than 2 mm, so that rainwater will spread evenly and quickly when falling on the surface, and a uniform water film is formed on the surface to solve the problem of rapid triggering.

The autonomous working apparatus 6100 provided in this embodiment will be described in detail below. The autonomous working apparatus 6100 provided in this embodiment includes a sealing structure with a sealed cavity c and the rain sensor 640 as described above, the rain sensor 640 is arranged on the sealing structure, the lower end face 6411 of the base 641 of the rain sensor 640 is exposed to the inside the sealed cavity c, and the upper end face 6411 of the base 641 is exposed to the outside the sealed cavity c. Specifically, the sealing structure includes two cover plates serving as components thereof, which are respectively an upper chassis cover 610 and a lower chassis cover 620. The upper chassis cover 610 has a half cavity formed by upward stretching, and the lower chassis cover 620 has a half cavity formed by downward stretching. The edge of one of the upper chassis cover 610 and the lower chassis cover 620 is configured with a protruding sealing strip, and the edge of the other of the upper chassis cover 610 and the lower chassis cover 620 is configured with a concave sealing groove, the sealing groove is equipped with a sealing element, and the sealing groove is configured to accommodate the sealing strip, so that the edge of the lower chassis cover 620 and the edge of the upper chassis cover 610 are hermetically connected, and the half cavities of the two chassis covers are oppositely combined to form the above-mentioned sealed cavity c. As shown in FIG. 8 and FIG. 9, two sealing positions a of the upper chassis cover 610 and the lower chassis cover 620 are respectively shown.

As shown in FIG. 8 and FIG. 9, the autonomous working apparatus 6100 further includes a cover body 630 arranged above the outside of the upper chassis cover 610. In this embodiment, the cover body 630 serves as a mounting substrate of at least a part of the rain sensor 640. The cover body 630 has a half cavity formed by upward stretching, and the half cavity is located at the outside of the sealed cavity c for providing a mounting space for the rain sensor 640. In this embodiment, the cover body 630 serves as the mounting substrate of at least a part of an emergency stop button 650 at the same time, so as to provide a mounting space for the emergency stop button 650. In other embodiments without the cover body 630, the chassis or the upper chassis cover 610 is usually used as the mounting substrate of at least a part of the rain sensor 640.

In this embodiment, one of the upper surface of the upper chassis cover 610 and the edge of the cover body 630 is configured with a protruding clamping strip, and the other of the upper surface of the upper chassis cover 610 and the edge of the cover body 630 is configured with a concave clamping groove, the clamping groove is configured to accommodate the clamping strip, so that the edge of the cover body 630 is clamped with the upper surface of the upper chassis cover 610. As shown in FIG. 8, two clamping positions b of the upper chassis cover 610 and the cover body 630 are shown, wherein the upper chassis cover 610 is configured with an upper cover hole 6111 penetrating through the thickness of the upper chassis cover 610, the base 641 is supported on the upper cover hole 6111 by a supporting structure 6414 thereon, and the lower end face 6412 of the base 641 passes through the upper cover hole 6111 to be exposed to the inside the sealed cavity c. The cover body 630 is configured with a cover body hole 6311 penetrating through the thickness of the cover body 630, the cover body 630 is supported on the supporting structure 6414 of the base 641 through the cover body hole 6311, and the upper end face 6411 of the base 641 passes through the cover body hole 6311 to be exposed to the outside the sealed cavity c.

In this embodiment, the supporting structure 6414 on the base 641 serves as a supporting foundation to facilitate the assembly and to improve the assembly performance and reliability of the rain sensor 640. However, in other embodiments, the base 641 has a peripheral surface 6413, the supporting structure 6414 is not arranged on the peripheral surface 6413, since the base 641 is made of a rubber material, it can be squeezed into the upper cover hole 6111 and/or the cover body 6311 through interference fit, and effective sealing protrusion can also be realized.

As shown in FIG. 10, in this embodiment, the upper cover hole 6111 is stretched upward from the surface of the upper chassis cover 610 to form a first supporting portion 611, and the cover body hole 6311 is stretched downward from the surface of the cover body 630 to form a second supporting portion 631. The base 641 located below the supporting structure 6414 is assembled with the first supporting portion 611, and the protrusion 6415 located in this area matches the inner wall of the first supporting portion 611 to ensure good sealing property. The base 641 located above the supporting structure 6414 is assembled with the second supporting portion 631, the lower end face of the second supporting portion 631 is configured with a water guide groove extending from the inner wall of the second supporting portion 631 toward the outer wall, and preferably, the water guide groove extends linearly along the radial direction of the second supporting portion 631. In other embodiments, the lower surface of the supporting structure 6414 can be directly supported on the upper surface of the upper chassis cover 610, and the lower surface of the cover body 630 can be directly supported on the upper surface of the supporting structure 6414. Preferably, the first supporting portion 611 and the second supporting portion 631 are continuous or discontinuous column ring structures.

In this embodiment, the upper surface of the upper chassis cover 610 is configured with a mounting portion 612 for accommodating the emergency stop button 650, the rain sensor 640 is placed within the coverage of the mounting portion 612, the emergency stop button 650 is installed in the mounting portion 612, the emergency stop button 650 is configured with an avoidance hole 654 for allowing the rain sensor 640 to pass through, so as to improve the integration level of the entire unit. Specifically, referring to FIG. 11, the mounting portion 612 is configured on the upper chassis cover 610, the mounting portion 612 is composed of a U-shaped vertical wall protruding from the upper surface of the upper chassis cover 610, and within the range enclosed by the U-shaped vertical wall, the upper chassis cover 610 is configured with a first supporting portion 611 penetrating through the thickness of the upper chassis cover 610 and a button mounting hole 613.

The emergency stop button 650 includes a pressing portion 651 and an extension portion 652 connected to the pressing portion 651, and the end of the extension portion 652 away from the pressing portion 651 is configured with two coaxial hinge shafts 653. Two coaxial semi-cylindrical accommodating portions 615 are configured at the two ends of the opening of the U-shaped vertical wall. Two coaxial semi-cylindrical accommodating portions 632 are configured on the lower surface of the cover body 630, the two coaxial semi-cylindrical accommodating portions 615 on the U-shaped vertical wall are in butt joint with the two coaxial semi-cylindrical accommodating portions 632 on the cover body 630 in a one-to-one correspondence manner and form two coaxial cylindrical accommodating portions, the two coaxial hinge shafts 653 on the extension portion 652 are accommodated in the two coaxial cylindrical accommodating portions in the one-to-one correspondence manner, and can rotate relative to the cylindrical accommodating portions. The pressing portion 651 is operatively and movably installed in the button mounting hole 613, and the upper end of the pressing portion extends out the cover body 630 to be located on the outer side of the cover body 630. When the pressing portion 651 is operated, the pressing portion 651 moves relative to the axial direction of the button mounting hole 613 and drives the extension portion 652 to rotate relative to the upper chassis cover 610 and the cover body 630, thereby realizing an emergency stop operation. The extension portion 652 covers the space between the cover body 630 and the upper chassis cover 610, an avoidance hole 654 penetrating through the thickness of the extension portion 652 is configured on the extension portion, the avoidance hole 654 is configured to allow the rain sensor 640, the first supporting portion 611 and the second supporting portion 631 to pass through. When the emergency stop button 650 is operated, the rain sensor 640 is not interfered. During assembly, the upper chassis cover 610 and the lower chassis cover 620 are assembled at first and are sealed to form the sealed cavity c, then the emergency stop button 650 and the rain sensor 640 are installed, the emergency stop button 650 and the rain sensor 640 can be installed without following a certain sequence, and the cover body 630 is installed at last.

Figure 15:
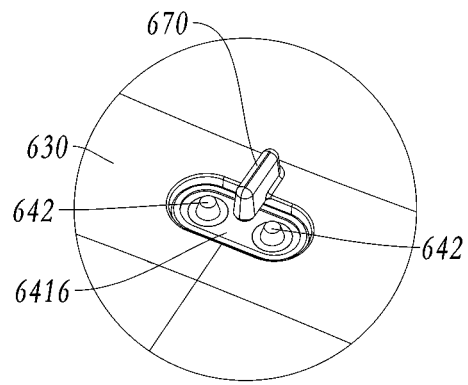
FIG. 15 is a partial schematic view of a rain sensor of an autonomous working apparatus according to another embodiment of the present invention.
Figure 16:
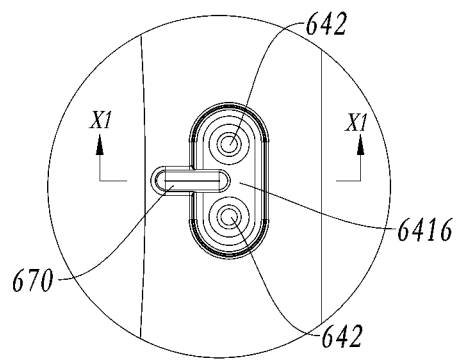
FIG. 16 is a partial top view of a rain sensor of an autonomous working apparatus according to another embodiment of the present invention.
Figure 17:
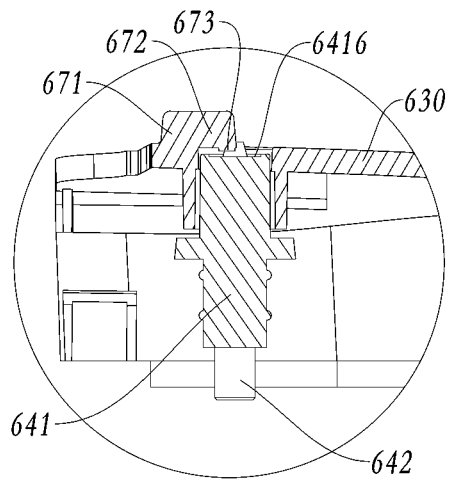
FIG. 17 is an X1-X1 section view of FIG. 17.

In the prior art, when an autonomous working system using a traditional rain sensor is working outdoors, if there is a sudden rainstorm, the raindrops are large and fast, and the raindrops directly impact the rain sensor, on one hand, since the substrate of the rain sensor is usually not infiltrative to water, it is not easy for the raindrops to form a continuous water film on the rain sensor; and on the other hand, due to the large impact force of the raindrops, it is easy to destroy the water film that originally exists on the rain sensor, such that the rain sensor is difficult to make timely and correct responses to the sudden rainstorm. In order to solve the above technical problems, another embodiment of the present invention discloses another rain sensor 640. Referring to FIGS. 15-17, since the rain sensor 640 of this embodiment is an improvement on the above-mentioned technical solution, only the improvements are described in detail here, and the same or similar technical features are omitted or briefly described. The rain sensor 640 in this embodiment includes a base 641, an electrode 642 and a protrusion body 670, wherein the protrusion body 670 is at least partially disposed directly above the upper end face 6411 of the base 641. The "directly above" mentioned here and hereinafter typically means that when the water collection surface 6416 is at a horizontal position, the projection of at least a part of the protrusion body 670 on the horizontal surface falls within the projection of the base 641 on the horizontal surface. In a preferred embodiment, typically referring to FIG. 17, there is a gap between at least a part of the protrusion body 670 and the upper end face 6411. In another preferred embodiment, not shown separately, the protrusion body 670 is configured to not touch the upper end face 6411. In another preferred embodiment, not shown separately, the protrusion body 670 is configured such that at least a part is in contact with the upper end face 6411.

Further referring to FIG. 17, the protrusion body 670 is configured to include a base portion 671 and an arm portion 672. The base portion 671 is configured to be connected with the mounting substrate of the rain sensor 640. In this embodiment, the cover body 630 constitutes at least a part of the mounting substrate, and the base portion 671 of the protrusion body 670 is connected to the cover body 630; and further, the base portion 671 is connected to the edge of the cover body hole 6311. In other embodiments, the chassis constitutes at least a part of the mounting substrate, the base portion 671 of the protrusion body 670 is connected to the chassis, and typically, the base portion 671 is connected to the upper chassis cover 610. In other embodiments, the base portion 671 is configured to be connected to the base 641 of the rain sensor 640, and typically, the base portion 671 is connected to the edge part of the base 641. The arm portion 672 is configured such that one end thereof is connected to the base portion 671, and the other end thereof is located directly above the upper end face 6411. In this embodiment, the protrusion body 670 is integrally formed with the mounting substrate or the base 641, the base portion 671 of the protrusion body 670 extends substantially upward from the mounting substrate or the base 641, the arm portion 672 extends from the upper part of the base portion 671 toward the middle of the base 641 substantially along the horizontal direction, preferably, the arm portion 672 extends directly above the water collection surface 6416, and there is a gap between at least a part of the arm portion 672 and the water collection surface 6416. Further, the distance from the upper surface of the arm portion 672 to the upper end face 6411 is greater than the distance from the upper surface of the electrode 642 to the upper end face 6411, that is to say, the height of the highest point of the arm portion 672 is greater than the height of the highest point of the electrode 642. Further, the distance from the lower surface of the arm portion 672 to the upper end face 6411 is less than the distance from the upper surface of the electrode 642 to the upper end face 6411, that is to say, the height of the lowest point of the arm portion 672 is less than the height of the highest point of the electrode 642. Through a large number of actual measurements, it can be proved that this structure is very beneficial to preventing the raindrops falling at high speed from directly impacting the water collection surface 6416 to a certain extent during the sudden rainstorm, so as to ensure that the rainwater can be accumulated in the water collection surface 6416 to conduct the electrodes 642. In an optimal embodiment, the base portion 671 and the mounting substrate are integrally formed. On one hand, the assembly process can be simplified to the greatest extent, and on other hand, it is conducive to simplifying the structure of the base 641 of the rain sensor 640, thereby reducing the complexity of production and processing and reducing the cost. In other embodiments, the protrusion body 670 can also be configured to be connected to the mounting substrate or the base 641 through processes such as gluing or welding, and can also be configured to be connected to the mounting substrate or the base 641 through a detachable connecting structure. In other embodiments, the protrusion body 670 is configured such that the first part of the protrusion (for example, the base portion 671) is integrally formed with the mounting substrate or the base 641, or is connected with the mounting substrate or the base 641 through processes such as gluing or welding, and the second part of the protrusion (for example, the arm portion 672) is connected to the first part of the protrusion through processes such as gluing or welding or through a detachable structure.

Further, the protrusion body 670 further includes at least one descending portion 673. In the embodiment shown in FIGS. 15-17, the protrusion body 670 includes one descending portion 673. In other embodiments, the protrusion body 670 can include two or more descending portions 673. The descending portion 673 is configured to extend downward from the lower surface of the end (typically a part corresponding to the water collection surface 6416) of the arm portion 672 away from the base portion 671. Preferably, the descending portion 673 is configured to locate directly below the arm portion 672 and directly above the water collection surface 6416. The "directly below" mentioned here and below typically means that when the water collection surface 6416 is at a horizontal position, the projection of the descending portion 673 on the horizontal plane completely falls within the projection of the arm portion 672 on the horizontal plane; and further, the projections of the two portions are not tangent. Preferably, the descending portion 673 is configured to not locate directly above any one of the electrodes 642; further, the electrode 642 includes a positive electrode and a negative electrode, which are arranged at intervals, and the descending portion 673 is configured to locate directly above the water collection surface 6416 between the positive electrode and the negative electrode. There is a gap between the descending portion 673 and the water collection surface 6416. At this time, there is a gap between the part of the protrusion body 670 directly above the water collection surface 6416 and the water collection surface 6416 as a whole; or the descending portion 673 is in contact with the water collection surface 6416, at this time, only the descending portion 673 in the part of the protrusion body 670 directly above the water collection surface 6416 is in contact with the water collection surface 6416, and there are gaps between the other parts of the protrusion body 670 directly above the water collection surface 6416 and the water collection surface 6416. Preferably, the descending portion 673 is configured as a structure with a large upper part and a smaller lower part, typically such as an inverted circular truncated cone shape, and an inverted cone shape. When the protrusion body 670 has the descending portion 673 of the above structure, the accumulation of the raindrops on the water collection surface 6416 can be further optimized, and the problem of the inability to form a continuous water film between the two electrodes 642 due to the tension of the water can be avoided, that is, the water collection surface 6416 is configured as a substantially flat surface.

Figure 18:
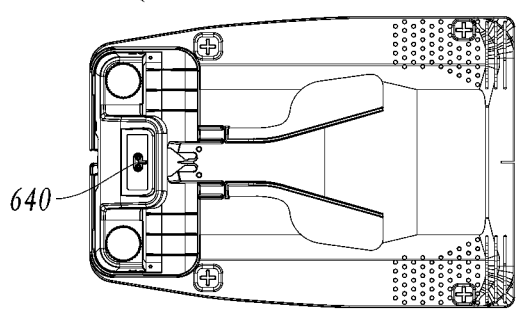
FIG. 18 is a schematic view of a docking station according to a further embodiment of the present invention.

The foregoing descriptions of the rain sensor 640 are all on the basis that the rain sensor 640 is arranged on the autonomous working apparatus 6100, but in some other embodiments, as shown in FIG. 18, the rain sensor 640 can also be arranged on the docking station 6900, at this time, the docking station 6900 includes a sealing structure with a sealed cavity and a control module arranged in the sealing structure, the sealing structure includes a docking station housing, the rain sensor 640 is configured to be arranged on the docking station housing, and correspondingly, the protrusion body 670 is preferably integrally formed with the docking station housing.

It should be understood that although this specification is described in terms of embodiments, not each embodiment contains only one separate technical solution, the specification is described in this way only for the sake of clarity and those skilled in the art should take the specification as a whole, and the technical solutions in each embodiment can be suitably combined to form other embodiments that can be understood by those skilled in the art.

The series of detailed descriptions set out above are only specific to a feasible embodiment of the invention and are not intended to limit the scope of protection of the invention; any equivalent embodiment or variation that does not depart from the spirit of the art of the invention shall be included within the scope of protection of the invention.

The invention claimed is:

1. An autonomous working system, comprising an autonomous working apparatus and a second apparatus independent of the autonomous working apparatus, the autonomous working system comprises a control circuit, wherein the control circuit comprises:
   a rain sensor, comprising a first electrode and a second electrode;
   a switching circuit, connected to the first electrode and the second electrode, and configured to operatively exchange the polarities of the first electrode and the second electrode;
   a detection module, configured to obtain an electrical signal of the rain sensor;
   a judgement module, configured to determine whether the electrical signal and a first threshold satisfy a first relationship; and
   a behavior control module, configured to control the autonomous working apparatus to change the behavior status when it is determined that the electrical signal and the first threshold satisfy the first relationship,
   wherein the switching circuit is configured to set the first electrode to a high potential and set the second electrode to a low potential in a first output state,
   wherein the switching circuit is configured to set the first electrode to a low potential and set the second electrode to a high potential in a second output state,
   wherein the switching circuit is configured to ground the first electrode and the second electrode for a predetermined time period when the switching circuit is in the second output state for a predetermined time interval.

2. The autonomous working system according to claim 1, wherein the control circuit is configured on the autonomous working apparatus.

3. The autonomous working system according to claim 1, wherein the control circuit is configured to comprise a first communication module which is configured to send the electrical signal to the autonomous working apparatus to cause the autonomous working apparatus changing its behavior status in response to the electrical signal;
   the rain sensor, the detection module and the first communication module are configured on the second apparatus; and
   the judgement module is configured on the autonomous working apparatus or on the second apparatus.

4. The autonomous working system according to claim 1, wherein the rain sensor comprises a base, at least the first and second electrodes and a protrusion body; the base has an upper end face and a lower end face, which are opposite to each other; an upper end of each electrode is at least partially exposed out of the upper end face of the base; and the protrusion body is at least partially configured directly above the upper end face, and there is a gap between at least a part of the protrusion body and the upper end face.

5. The autonomous working system according to claim 1, wherein the control circuit further comprises a switching control module which is configured to control the switching circuit to exchange the polarities of the first electrode and the second electrode.

6. The autonomous working system according to claim 5, wherein the switching control module is configured to send a first switching signal and a second switching signal to the switching circuit; and the switching circuit is configured to enter the first output state upon receiving the first switching signal and enter the second output state upon receiving the second switching signal.

7. The autonomous working system according to claim 6, wherein the switching control module is configured to alternately send the first switching signal and the second switching signal to the switching circuit at predetermined time intervals.

8. The autonomous working system according to claim 1, wherein the detection module is configured to obtain a first electrical signal of the rain sensor when the switching circuit is in the first output state;
   the judgement module is configured to determine whether the first electrical signal and the first threshold satisfy the first relationship; and
   the behavior control module is configured to control the autonomous working apparatus to change the behavior status when it is determined that the first electrical signal and the first threshold satisfy the first relationship.

9. The autonomous working system according to claim 8, wherein the judgement module is configured to further determine whether at least two first electrical signals are equal; and
   the behavior control module is configured to change the behavior status of the autonomous working apparatus when it is determined that at least two successive first electrical signals are substantially equal and that the at least two successive first electrical signals and the first threshold satisfy the first relationship.

10. The autonomous working system according to claim 8, wherein the detection module is configured to obtain the first electrical signal of the rain sensor at the moment when or at a predetermined time after the switching circuit enters the first output state.

11. The autonomous working system according to claim 8, wherein the detection module is further configured to obtain a second electrical signal of the rain sensor when the switching circuit is in the second output state.

12. The autonomous working system according to claim 11, wherein the detection module is configured to obtain the second electrical signal of the rain sensor at the moment when the switching circuit enters the second output state or at a predetermined time afterward.

13. The autonomous working system according to claim 1, wherein the switching circuit comprises a first end connected to the first electrode and a second end connected to the second electrode.

14. The autonomous working system according to claim 1, wherein the switching circuit comprises a first end and a second end, the first end is connected to the first electrode, and the second end is connected to the second electrode; the switching circuit further comprises a divider resistor connected in series with the rain sensor, the first end is connected to the first electrode through the divider resistor, and the detection module obtains the electrical signal by detecting the electrical level between the rain sensor and the divider resistor; and the first relationship comprises that the electrical signal is less than or equal to the first threshold.

15. The autonomous working system according to claim 14, wherein
   the detection module is configured to obtain a first electrical signal of the rain sensor when the switching circuit in the first output state and obtain a second electrical signal of the rain sensor when the switching circuit is in the second output state;
   the judgement module is further configured to determine whether a sum value of the first electrical signal and the second electrical signal is equal to a first preset value; and
   the behavior control module is further configured to change the behavior status of the autonomous working apparatus when it is determined that the electrical signal and the first threshold satisfy the first relationship and that the sum value of the first electrical signal and the second electrical signal is equal to the first preset value.

16. The autonomous working system of claim 14, wherein:
   the judgement module is further configured to determine whether the electrical signal is equal to the voltage of the power supply; and
   the behavior control module is further configured to determine whether the behavior status of the autonomous working apparatus is a working status or a stop status when it is determined that the electrical signal is equal to the voltage of the power supply, and control the autonomous working apparatus to enter the working status when it is determined that the autonomous working apparatus is in the stop status.

17. The autonomous working system according to claim 1, wherein controlling the autonomous working apparatus to change the behavior status comprises controlling the autonomous working apparatus to stop working and/or return to a base station.

18. The autonomous working system according to claim 1, wherein the rain sensor comprises a base and at least the first and second electrodes; the base has an upper end face and a lower end face, which are opposite to each other; the lower end face is intended to be exposed to the inside of a sealed cavity, and the upper end face is intended to be exposed to the outside of the sealed cavity; and at least one of the electrodes is embedded in the base, and the both ends of the electrode penetrate through the upper end face and the lower end face respectively.

* * * * *